United States Patent [19]

Higashida et al.

[11] Patent Number: 5,289,322
[45] Date of Patent: Feb. 22, 1994

[54] DATA REARRANGEMENT PROCESSING APPARATUS FOR DIGITAL VIDEO SIGNAL RECORDING APPARATUS

[75] Inventors: Masaaki Higashida; Keiichi Ishida; Toshiaki Koya, all of Osaka; Kunio Suesada, Ikoma, all of Japan

[73] Assignee: Matsushita Electric Industrial Co., Ltd., Osaka, Japan

[21] Appl. No.: 761,061

[22] Filed: Sep. 18, 1991

[30] Foreign Application Priority Data

Sep. 18, 1990 [JP] Japan .................. 2-249434

[51] Int. Cl.$^5$ .................. G11B 5/00; G11B 5/09
[52] U.S. Cl. .................. 360/32; 371/38.1; 371/44
[58] Field of Search .................. 360/32, 48, 53; 371/38.1, 39.1, 44, 45

[56] References Cited

U.S. PATENT DOCUMENTS

| 4,748,519 | 5/1988 | Lagadec et al. | 360/48 |
| 4,751,590 | 6/1988 | Wilkinson | 360/19.1 |
| 5,185,740 | 2/1993 | Kurose et al. | 360/32 X |

FOREIGN PATENT DOCUMENTS

| 0213961 | 3/1987 | European Pat. Off. |
| 0276809 | 8/1988 | European Pat. Off. |
| 0397472 | 11/1990 | European Pat. Off. |
| 3544819 | 6/1986 | Fed. Rep. of Germany |

OTHER PUBLICATIONS

"19-mm type D-2 composite format-helical data and control records", SMPTE Journal, Jul. 1990.

*Primary Examiner*—Paul Gensler
*Attorney, Agent, or Firm*—Lowe, Price, LeBlanc & Becker

[57] ABSTRACT

An apparatus is described for rearranging the relative positions of data samples of a digital video signal within each field of the video signal, for use in a digital VTR in which alternate samples are separated into two different recording channels to be recorded on different tracks of a recording medium. The apparatus includes an intra-line shuffling circuit and a field memory into which output data from the shuffling circuit are written, such that adjacent samples which are of the same channel and are located mutually adjacent in the same line of the video signal are read out from the memory and recorded on respectively different tracks of the recording medium, thereby ensuring that if a sample is lost due to a read error, the adjacent samples of the same channel will always be available for use in interpolation processing to compensate for the lost sample.

5 Claims, 16 Drawing Sheets

FIG. 1
PRIOR ART

|  | 768 SAMPLES/LINE | |
|---|---|---|
|  | 0 | 767 |

```
            |← 768 SAMPLES/LINE →|
            0                   767
        ┌───────────────────────────┐  ─
      0 │ 0 1 0 1 0 1   · · ·   0 1 │  ↑
        │ 1 0 1 0 1 0   · · ·   1 0 │
SEGMENT │       ·               ·   │ 85 LINES/
   0    │       ·               ·   │ SEGMENT
        │       ·               ·   │
        │ 1 0 1 0 1 0   · · ·   1 0 │
     84 │ 0 1 0 1 0 1   · · ·   0 1 │  ↓
        ├───────────────────────────┤  ─
     85 │ 1 0 1 0 1 0   · · ·   1 0 │
        │ 0 1 0 1 0 1   · · ·   0 1 │
SEGMENT │       ·               ·   │
   1    │       ·               ·   │
        │       ·               ·   │
        │ 0 1 0 1 0 1   · · ·   0 1 │
    169 │ 1 0 1 0 1 0   · · ·   1 0 │
        ├───────────────────────────┤
    170 │ 0 1 0 1 0 1   · · ·   0 1 │
        │ 1 0 1 0 1 0   · · ·   1 0 │
SEGMENT │       ·               ·   │
   2    │       ·               ·   │
        │       ·               ·   │
        │ 1 0 1 0 1 0   · · ·   1 0 │
    254 │ 0 1 0 1 0 1   · · ·   0 1 │
        └───────────────────────────┘
```

← 1 FIELD →

FIG. 5

| COL → | 0 | 76 | 152 | 228 | 304 | 380 | 456 | 532 | 608 | 684 | 760 | 836 | 911 | |
|---|---|---|---|---|---|---|---|---|---|---|---|---|---|---|
| | 0 | 1 | 2 | 3 | 4 | 5 | 6 | 7 | 8 | 9 | 10 | 11 | | |
| | | (NO. OF LINES IN ONE FIELD) | | | (NO. OF LINES IN ONE FIELD) | | | | (NO. OF LINES IN ONE FIELD) | | | | | |
| 0 | 1884 | 1885 | 1886 | 1887 | 1888 | 1889 | 1890 | 1891 | 1892 | 1893 | 1894 | 1895 | | OUTER CODE DATA BYTES |
| | 1896 | 1897 | 1898 | 1899 | 1900 | 1901 | 1902 | 1903 | 1904 | 1905 | 1906 | 1907 | | |
| 157 | | | | | | | | | | | | | | |
| 158 | 1980 | 1981 | 1982 | 1983 | 1984 | 1985 | 1986 | 1987 | 1988 | 1989 | 1990 | 1991 | | OUTER CODE CHECK BYTES |
| 165 | | | | | | | | | | | | | | |

ROW →

LIST OF SUCCESSIVE COMBINATIONS OF VALUES
(Fld, Ch, Seg, XinsT)

(0, 0, 0, 0    ),  (0, 0, 1, 474  ),  (0, 0, 2, 948  ),  (0, 0, 3, 1422),
(0, 1, 0, 711  ),  (0, 1, 1, 1185),  (0, 1, 2, 1659),  (0, 1, 3, 237  ),
(1, 0, 0, 59   ),  (1, 0, 1, 533  ),  (1, 0, 2, 1007),  (1, 0, 3, 1481),
(1, 1, 0, 770  ),  (1, 1, 1, 1244),  (1, 1, 2, 1718),  (1, 1, 3, 296  ),
(2, 0, 0, 118  ),  (2, 0, 1, 592  ),  (2, 0, 2, 1066),  (2, 0, 3, 1540),
(2, 1, 0, 829  ),  (2, 1, 1, 1303),  (2, 1, 2, 1777),  (2, 1, 3, 355  ),
(3, 0, 0, 177  ),  (3, 0, 1, 651  ),  (3, 0, 2, 1125),  (3, 0, 3, 1599),
(3, 1, 0, 888  ),  (3, 1, 1, 1362),  (3, 1, 2, 1836),  (3, 1, 3, 414  ),
(4, 0, 0, 236  ),  (4, 0, 1, 710  ),  (4, 0, 2, 1184),  (4, 0, 3, 1658),
(4, 1, 0, 947  ),  (4, 1, 1, 1421),  (4, 1, 2, 1895),  (4, 1, 3, 473  ),
(5, 0, 0, 295  ),  (5, 0, 1, 769  ),  (5, 0, 2, 1243),  (5, 0, 3, 1717),
(5, 1, 0, 1006),  (5, 1, 1, 1480),  (5, 1, 2, 58   ),  (5, 1, 3, 532  ),
(6, 0, 0, 354  ),  (6, 0, 1, 828  ),  (6, 0, 2, 1302),  (6, 0, 3, 1776),
(6, 1, 0, 1065),  (6, 1, 1, 1539),  (6, 1, 2, 117  ),  (6, 1, 3, 591  ),
(7, 0, 0, 413  ),  (7, 0, 1, 887  ),  (7, 0, 2, 1361),  (7, 0, 3, 1835),
(7, 1, 0, 1124),  (7, 1, 1, 1598),  (7, 1, 2, 176  ),  (7, 1, 3, 650  ),

DATA REARRANGEMENT PROCESSING APPARATUS FOR DIGITAL VIDEO SIGNAL RECORDING APPARATUS

BACKGROUND OF THE INVENTION

1. Field of the Invention

The present invention relates to an apparatus for rearranging data in each field of a digital video signal prior to recording that signal on a recording medium, to reduce the possibility that digital samples which are located closely adjacent in a horizontal scanning line of the video signal will be simultaneously lost as a result of occurrence of a burst error in the recording/playback process.

2. Description of the Related Art

When a digital video signal is recorded and subsequently played back, using a recording medium such as magnetic tape or a magnetic disc, read errors will occasionally occur in one or more tracks of the recording medium, due to such factors as dust or scratches on the surface of the recording medium, etc. When such a read error occurs, one or more digital samples will be lost, i.e. an erroneous value for that sample will appear on the recording medium. The occurrence and positions of such errors are detected at the time of playback by utilizing error detection data that are recorded together with the digital video signal samples. Since there is usually a very high degree of correlation between each sample and samples which are located closely adjacent to it in the resultant playback video picture, it is possible to compensate for such a read error by deriving an interpolated value for the lost sample, using the values of these adjacent samples. If that is done, the effects of such read errors can be effectively prevented from affecting the resultant displayed playback video picture. Such interpolation to minimize the display effects of read errors will be referred to as "retouching", since it is analagous to photographic retouching which is executed to hide small blemishes in a photograph. Usually, the adjacent samples that are used in that processing (with respect to the positions of the samples in a displayed picture) consist of the closest sample in the horizontal scan line immediately above line containing the sample that is lost, the closest sample in the line immediately below that containing the lost sample, the two samples located immediately to the left of the lost sample, in the same line as the lost sample, and the two samples located immediately to the right of the lost sample, in the same line. In practice, a combination of two or more of these adjacent samples, which is found to provide optimum correction for the specific sample that has been lost, is selected to be used in the "retouching" processing. Thus in order to ensure that optimum compensation can be applied for any lost sample, it is essential that all of these adjacent samples be available, for use in the "retouching" processing, so that to achieve optimum compensation for read erros, it is necessary to ensure that all of the aforementioned set of samples which are located closely adjacent to a sample that has been lost due to a read error will be available for use in that "retouching" compensation. In particular, it is necessary to ensure that the adjacent samples that are in the same line of the video signal as a sample that has been lost due to a burst error (i.e. which extends along a recording track over a number of successive samples) will not also be lost as a result of that same burst error.

To attempt to ensure that such a condition will not occur, proposals have been made in the prior art for rearranging the order of the samples of the digital video signal prior to recording, such as to ensure that samples which will be located closely mutually adjacent in the displayed picture will be spaced mutually far apart on the recording medium. Such a method of digital video signal recording, employing rearrangement of sample numbers (i.e. numbers which express the respective positions of the samples in the original digital video signal) is referred to as "shuffling".

If a digital video signal has been recorded after executing such shuffling processing, then ideally at the time of playback, even if some samples have been lost, normal reproduction can be achieved by executing interpolation processing as described above, since samples which are required in that interpolation processing will not have been lost (i.e. due to the fact that these were located far apart from the lost sample, on the recording medium).

In a digital VTR, alternately occurring samples in each line of the video signal are separated and processed in two different recording channels, referred to in the following as channel 0 and channel 1. The channel 0 and channel 1 samples are recorded on mutually different tracks. Hence a burst error on one track, resulting in the loss of a number of samples recorded on that track, cannot result in loss of the pair of samples located immediately adjacent to each lost sample and in the same line, since these most closely adjacent samples will be recorded (through a different channel) on different tracks from that on which the burst error occurred. However there is a high probability that the two samples that are in the same channel and the same line as a sample that has been lost due to a burst error will also be lost as a result of that same burst error. Hence these samples of the same line and same channel will not be available for use in "retouching" interpolation processing to compensate for each sample that has been lost.

A prior art recording technique, which attempts to provide a shuffling method whereby that problem will be overcome, is described in an article entitled "19-mm Type D-2 Composite Format Helical Data and Control Records", in the SMPTE Journal, July, 1990. With a helical scan recording type of digital VTR, due to the fact that the amount of information in each field of the video signal is extremely large, the samples of each field are divided among a plurality of tracks on the recording tape. Each sample is assigned a channel number and a segment number, in accordance with the track on which the sample is to be recorded. The samples are distributed in the tracks in a manner determined by these numbers. That is to say, samples which have the same segment number and the same channel number will be recorded on the same track.

FIG. 1 is a diagram illustrating the method of assigning channel numbers and segment numbers with that prior art shuffling technique, for the case of an NTSC video signal. As shown in FIG. 1, prior to recording, a field consists of 255 horizontal scanning lines (referred to in the following simply as "lines") each formed of 768 samples. First, the channel 0 and channel 1 samples of the field are separated, to be processed mutually separately. Then for each set of channel 0 and channel 1 samples, shuffling of samples is executed mutually separately within each of the lines, then error detection check bytes referred to as outer code check bytes are added to each line, with four of these outer code check bytes being added for every set of 1/6 of the samples of the line. For each channel, the resultant set of (sample+check byte) bytes is then divided into four segments, each consisting of 85 lines as indicated in FIG. 1. Shuffling is then executed of the digital video signal within each segment, independently of the other segments. Each of the resultant segments of each channel is then recorded on a separate track of a magnetic recording tape, with the resultant track pattern being as illustrated in FIG. 2, with the segments of channel 1 and channel 0 being recorded in successive alternation. In FIG. 2, S denotes the segment number, Ch denotes the channel number.

However with such a method, if there are occasional defects on the recording medium, and if a defect results in a burst error occurring whereby a plurality of successive samples recorded on the same track are lost, then a basic problem arises, which will be described referring to FIG. 3. Here, five successive samples of which occur in the same line of a field of the digital video signal are designated as 901 to 905. In the following description and in the appended claims, digital video signal samples which have the same relationship as that existing between the samples 901 and 903, or between the samples 903 and 905 in FIG. 3 will be referred to as "adjacent samples of the same line and same channel". With the prior art method of recording described above, adjacent samples of the same line and same channel will each have the same segment number and the same channel number. Hence, after shuffling has been completed, such adjacent samples of the same line and same channel will be recorded on the same track, e.g. as shown in FIG. 2.

If a burst error should occur along the longitudinal direction of a track, as shown by the hatched-line portion in FIG. 2, a plurality of successively recorded samples are lost. Considering any one of these samples, e.g. the sample 903, the adjacent samples of the same line and same channel as sample 903 (i.e. 901 and 905) may also be lost, with such a prior art recording method, as a result of the fact that all of these samples have the same segment number (0). Hence, it will not be possible to use these samples in interpolation processing to compensate for the loss of sample 903, i.e. complete implementation of the "retouching" processing described hereinabove becomes impossible. The same is true for any other sample which is lost as a result of a burst error occurring along one of the recording tracks, and this is a basic disadvantage of such a prior art recording method, which is caused by the fact that adjacent samples of the same line and same channel are recorded on the same track of the recording medium.

In a practical apparatus, when it is thus made impossible to execute retouching by using samples which have a very high correlation with a sample that has been lost, retouching processing may be executed by using samples which have a substantially lower degree of correlation with the lost sample. However when that is done, satisfactory compensation for samples that are lost as a result of read errors cannot be ensured.

SUMMARY OF THE INVENTION

It is an objective of the present invention to overcome the prior art problem set out above, by providing a signal processing apparatus for a digital video signal recording apparatus whereby adjacent samples of the same line and same channel (as defined hereinabove) will be recorded on respectively different tracks of a recording medium.

It is a further objective of the present invention to provide such a signal processing apparatus, for application to an NTSC standard video signal that has been converted to a digital video signal, whereby adjacent samples of the same line and same channel are recorded by respectively different recording heads.

To achieve the above objectives, according to a first aspect the present invention provides, in a recording apparatus for recording on a recording medium a digital video signal consisting of successive samples, said samples being arrayed in successive lines and fields of said video signal, said apparatus including channel allocation means for allocating alternate ones of said samples of each line of said video signal to a first recording channel and a second recording channel respectively and recording means for recording samples of said first and second channels on respectively different tracks of said recording medium, a data rearrangement apparatus coupled between said channel allocation means and said recording means, said data rearrangement apparatus comprising for each of said channels:

buffer memory means;

address rearrangement means for writing said samples of said channel of one field of said digital video signal into said buffer memory in a predetermined array configuration; and read circuit means for successively reading out from said buffer memory each of a plurality of sets of said samples stored in specific regions of said buffer memory, and for supplying said samples thus read out to said recording means at timings such that said samples of respective ones of said regions are written onto respectively different ones of said tracks of said recording medium;

said array configuration and specific regions being predetermined such that adjacent samples of a same line and same channel in a field are written into respectively different ones of said regions.

According to a second aspect of the invention, said digital video signal is obtained by converting an NTSC standard video signal to digital form, and for each of said channels, alternate ones of said tracks are recorded by respectively different ones of a plurality of recording heads, and said array configuration and specific regions are predetermined such that said adjacent samples of the same channel and same line are recorded by respectively different ones of said heads.

BRIEF DESCRIPTION OF THE DRAWINGS

FIG. 1 is a diagram for illustrating channel and segment distribution in one field, in the case of a prior art apparatus utilizing shuffling processing of a digital video signal;

FIG. 5 is a diagram illustrating the logical configuration of a field memory used in a first embodiment of the invention, for the case of a PAL standard digital video signal;

FIG. 6 is a diagram illustrating a method of reading out from the field memory a field having a color frame number Fld=0 and a channel number Ch=0, used in the first embodiment of the present invention, for the case of a PAL standard digital video signal;

FIG. 7 is a list of successive combinations of values (Fld, Ch, Seg, Xin$_{st}$) which occur in reading out one 8-field "color frame" from the field memory of FIG. 6;

DESCRIPTION OF PREFERRED EMBODIMENTS

An embodiment of the present invention will be described, with the description being given for the case of processing the samples of a field which have the same channel number, i.e. shuffling of the channel 0 samples will be described. Similar processing is applied to the channel 1 samples of each field. Interchanging of addresses of samples of a field will be referred to as field shuffling.

Figure 4:
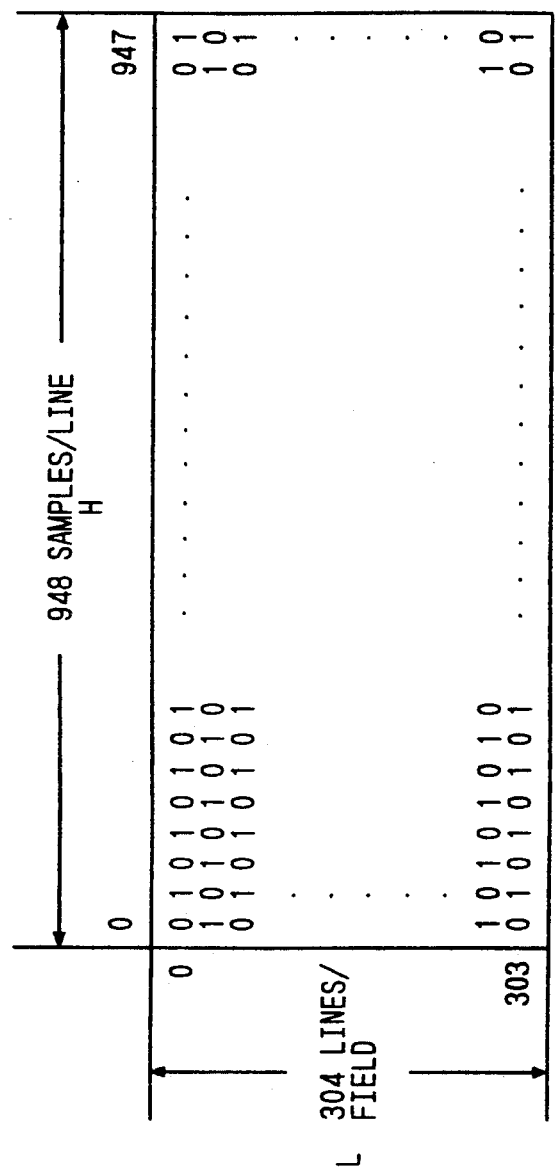
FIG. 4 is a diagram for illustrating how samples are addressed within a field, based on line numbers (arrayed along the vertical direction), sample numbers (arrayed along the horizontal direction), and channel numbers, for the case of a PAL standard digital video signal.

This embodiment is applicable to a digital video signal which has been derived by converting a PAL standard video signal to digital form. Firstly, the field shuffling operation will be described in terms of equations, and thereafter the operation of the embodiment will be described. Referring first to FIG. 4, the distribution of samples within one field of a PAL standard digital video signal is shown. The field consists of 304 lines of samples (where each line corresponds to a horizontal scanning line of the original video signal), with each line consisting of 948 samples, and with the channel numbers successively alternating within each line as shown. It can thus be understood that the position of each sample is defined by an address in the field (referred to in the following as the video address) which is a 2-dimensional address consisting of one of the set of sample numbers H shown arrayed along the horizontal direction in FIG. 4, where H is $\{0, 1, \ldots, 947\}$, and one of the set of line numbers L, arrayed along the vertical direction in FIG. 4, where L is $\{0, 1, \ldots, 303\}$. In addition, each sample is specified by a channel number, which is either 1 or 0, with the channel numbers alternating for successive samples in a line.

Considering the samples of only one channels of a field, the position of each sample along a line, i.e. position along the horizontal direction as seen in FIG. 4, is defined by a number Hch. Hch is related to H as follows:

$$Hch = \text{int}(H/2) \qquad (1)$$

Thus the values of Hch are $\{0, 1, \ldots, 473\}$. In equation (1), the term of the form int (x) signifies the largest integer that is equal to or smaller than x. For example, if H=947, then Hch=473. The video addresses of all of the samples of one channel can thus be expressed by combinations of values of L and Hch.

This embodiment basically differs from the prior art as follows. In the case of the prior art, samples of one field have already been divided into segments at this stage. However with the present invention, the samples of one field are divided into segments, to be recorded on respective tracks of the recording medium, only after field shuffling has been completed.

The samples of one channel of each field, with locations of the samples being expressed by video addresses using L and Hch as described above, are written into a field memory. FIG. 5 shows the logical configuration of that field memory. Although addresses within a field memory can be expressed as a one-dimensional set of numbers, 2-dimensional addresses are used for the purpose of writing data into and reading data from the field memory. Each of these 2-dimensional addresses in the field memory is expressed as a combination of a row value designated as Row (these values being incremented along the vertical direction in FIG. 5) and a column value Col (these values being incremented along the vertical direction). In this embodiment, Row takes the values $\{0, 1, \ldots, 165\}$, and Col takes the values $\{0, 1, \ldots, 911\}$. The values 0 to 157 of Row express the (vertical direction) addresses of the sets of sample value data bytes, with 157 being ⅓ of the maximum value of Hch, i.e. ⅓ of the number of samples in one line which are of the same channel. The eight Row addresses 158 to 165 are those of error detection check bytes, referred to in the following as outer code check bytes. 8 of these outer code check bytes are added to each column of samples before writing into the field memory (e.g. to the column of samples having the Col number 0) as described in detail hereinafter. The maximum value of Col, 911, is three times the number of lines in one field of the digital video signal.

Field shuffling is executed by converting the video addresses (L, Hch) of the samples of one channel in one field of the digital video signal to (Row, Col) addresses in the field memory, and is performed by an address conversion circuit described hereinafter. In the following description unless otherwise stated, the designation "samples of one field" is used for brevity to refer to the samples of one field which are of the same channel, which will be assumed to be channel 0. A number Fld, which is one of the values {0, 1, . . . 7} is assigned to each field of the digital video signal in accordance with the color frame position of that field, i.e. the position of the field within a cyclically repeated sequence of 8 consecutive fields known as a color frame. In the following description it will also be assumed that operation is described for a field having the value 0 for Fld, i.e. that processing of the channel 0 samples of the first field of a color frame is being described.

For each line of the field, sample values are written in the Row direction, i.e. the vertical direction as seen in FIG. 5. However prior to writing the samples of a line of the field into the field memory, the line is divided into three blocks (with each sample being assigned a block number Oblk in addition to its Hch number) and shuffling of the samples within each block is executed (mutually independently among the three blocks) with each block being written into the field memory, in the Row direction, after the shuffling has been executed. The relationship between Oblk and Hch is in accordance with equation (2) below:

$$Oblk = Hch \bmod 3 \qquad (2)$$

In the above, "mod" signifies that a modulo computation is executed, i.e. Oblk can take only the values {0, 1, 2}. For example if Hch=473, then Oblk=2.

Addresses of samples within a block are defined as Hd. The relationship between Hd and Hch is as follows:

$$Hd = int\ (Hch/3) \qquad (3)$$

That is to say, Hd takes the values {0, 1, . . . , 157}. For example of Hch=473, then Hd=157.

Shuffling is executed mutually separately for the three blocks into which a line has been separated, by address conversion. For each sample within a block, a new address value of that sample within the block (that address being designated as 0 byt) is derived based on the values of hd, Oblk and L of that sample, and upon three constants designated as A, B and C and referred to in the following as shuffling constants. That new address value Obyt is then used as a Row address for writing the sample into the field memory. The address conversion to obtain an Obyt value for a sample is executed in accordance with the following equation:

$$Obyt = A * Hd + B * Oblk + C * L \bmod 158 \qquad (4)$$

Obyt takes values in the range {0, 1, . . . , 157}. When all of the values of Obyt have been obtained for one of the three blocks, then 8 outer code check bytes are calculated for that block, with 8 Obyt values being assigned to these check bytes. These check bytes are then attached to the block of sample values, and the resultant block is written into the field memory by assigning to each sample and check byte a value of Row address that is equal to the corresponding Obyt value. That is to say, $$Row = Obyt \qquad (5)$$

In that way, the 158 samples of a block are written into the field memory in the vertical (Row) direction as shown in FIG. 5, but with the order of these samples having been altered as a result of the assignment of Obyt values, and with 8 check bytes attached to the block. The above operation is executed successively for each of 3 the blocks into which a line has been divided, and for all of the lines of the field.

The Col address value for writing such a (sample data+check bytes) block into the field memory is obtained as follows:

$$Col = 304 * Oblk + L \qquad (6)$$

As shown by equation (6), the 304 lines of (channel 0) samples of one field are divided into three sets of 304 columns, along the Col direction as seen in FIG. 5.

All of the samples of one field are thereby stored in the field memory after having been converted to units of blocks. In the following, the data bytes thus written into the field memory (which have Row direction address numbers from 0 to 157 in FIG. 5) will be referred to as the outer code data bytes, while the check bytes that have been attached thereto (having the Row direction address numbers from 158 to 165 in FIG. 5) will be referred to as the outer code check bytes.

On completion of storing all of the (channel 0) sample data and outer code check bytes of one field into the field memory, read-out from the field memory begins. Writing into the field memory is executed in the Row direction, i.e. the vertical direction as shown in FIG. 5, however reading out of the memory is executed in the Col direction, i.e. the horizontal direction as seen in FIG. 5.

Figure 6:
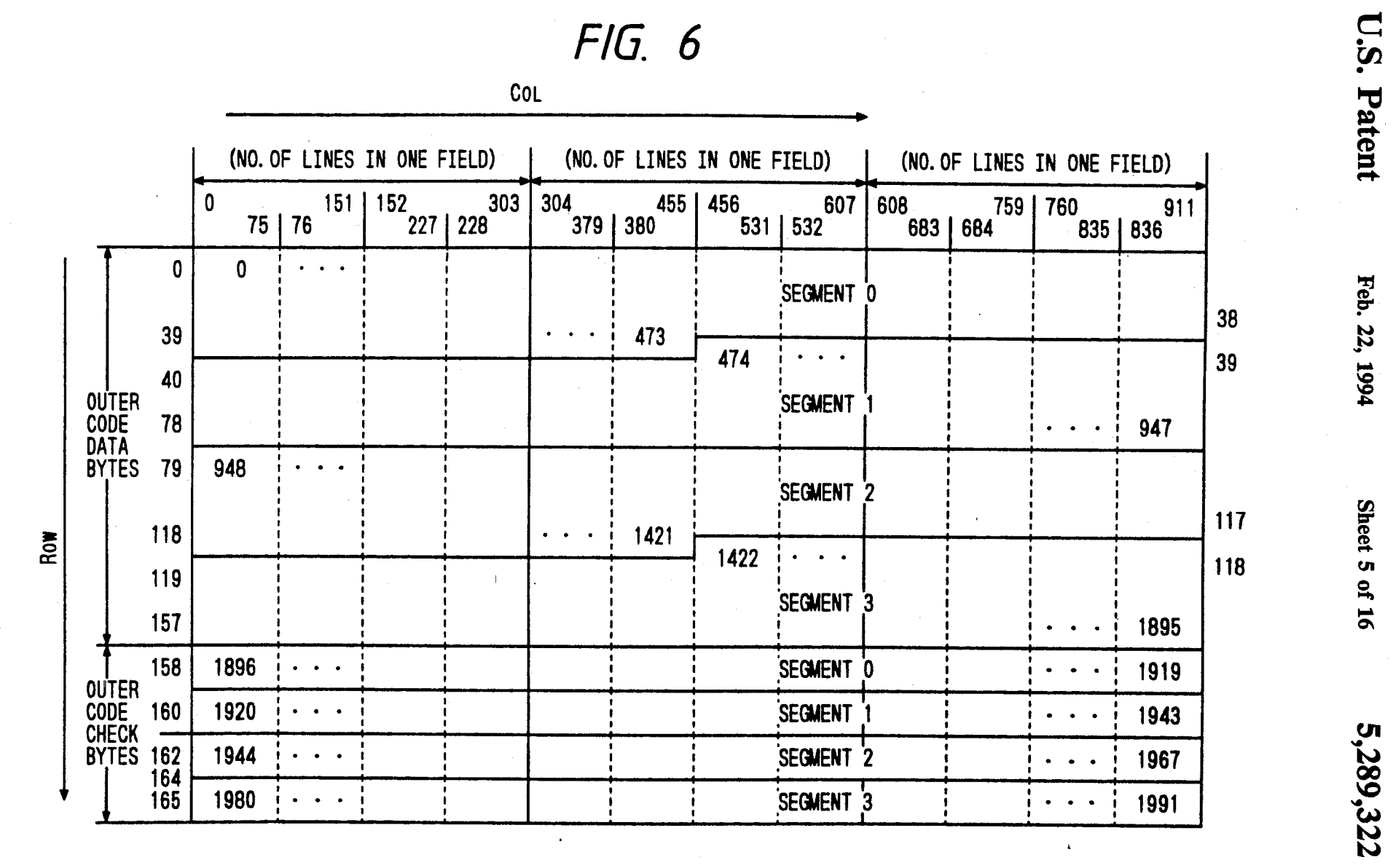

FIG. 6 is a diagram showing an example of a method of reading out sample data and check bytes from the field memory of FIG. 5, with the memory of FIG. 6 being identical to that of FIG. 5 and being assumed to have the same contents. As for FIG. 5, it is assumed in FIG. 6 that the channel 0 samples of the field for which Fld=0 have been written into the field memory. The samples of one channel of a field constitute an extremely large amount of data, so that it is impossible to write all of that data on one track of the magnetic tape. With this embodiment, the samples of one channel of a field stored in the field memory are divided into 4 segments, for the purpose of recording, with these segments being recorded on 4 respective tracks of the magnetic tape, i.e. 1 segment to one track. These 4 segments are designated by segment numbers 0, 1, 2 and 3 respectively. The outer code data bytes are divided among these four segments, with each segment being read out from the field memory in the direction of increasing Col numbers, i.e. along the horizontal direction as seen in FIG. 6. The row of check bytes of a segment are read out first in that manner (e.g. the bytes having the Row address 158, for segment 0 in FIG. 6), followed by the data bytes of that segment which have the lowest value of Row address (e.g. the bytes having the Row address 0, in segment 0), then the data bytes of the segment that have the next-highest value of Row address, and so on, until the last data byte of the segment has been read out. That process is then repeated for the next segment.

Read-out is executed in block units of 76 bytes, referred to in the following as inner code blocks. One-dimensional addresses are assigned to the inner code blocks, numbered from 0 to 1991 in FIG. 6. These addresses will be designated in general as Xin. Each Xin value is related a corresponding Row and Col combination by the following equations:

$$Xin = Row*12 + Cin \quad (7)$$

where:

$$Cin = int\ (Col/76) \quad (8)$$

In FIGS. 5 and 6 (for the case of the channel 0 samples of a field for which Fld=0) the Xin values 1896 to 1991 are those of the outer code check bytes, while the Xin values 0 to 1895 are those of the outer code data bytes.

For each segment, the starting inner code block address for read-out of the outer code check bytes is obtained as:

$$Xin = 1896 + 24*Seg \quad (9)$$

In the above, Seg denotes the segment number within the field.

The starting address for read-out of the outer code data bytes of the segment is obtained as:

$$Xin = (473*Seg + 59*Fld + 711*Ch)\ mod 1896 \quad (10)$$

Fld denotes the sequence number of the field within the color frame, and Ch is the channel number. Seg takes the values {0, 1, 2, 3,}, Fld takes the values {0, 1, 2, 3, 4, 5, 6, 7}, and Ch takes the values {0, 1}. As will be clear from equations (9) and (10), an offset with respect to the value 0 is established for the first Xin address from which read-out of the outer code data bytes begins. In the example of FIG. 6 that offset is zero, since the values of Seg, Fld and Ch are all zero in the case of segment of 0 of the channel 0 samples of the first field of the color frame, which is assumed to be the case in FIG. 6. Thus the starting value of Xin for read-out is 0, and the final value is 1895.

It can thus be understood that the sequence of reading out a field from the field memory is as follows:

---

The outer code check bytes of segment 0
↓
The outer code data bytes of segment 0
↓
The outer code check bytes of segment 1
↓
The outer code data bytes of segment 1
↓
The outer code check bytes of segment 2
↓
The outer code data bytes of segment 2
↓
The outer code check bytes of segment 3
↓
The outer code data bytes of segment 3

---

Thus in the case of FIG. 6, which is for the case of a field for which Fld is 0 and the channel number Ch is also 0, the segment 0 is read out in the sequence of Xin values from 1896 to 1819 (the outer code check bytes), then from Xin=0 to 473 (the outer code data bytes). The segment 1 is then read out in the sequence Xin=1920 to 1943 (the outer code check bytes), then from Xin=474 to 947 (the outer code data bytes). Similarly, segment 2 is read out in the sequence Xin=1944 to 1967 (the outer code check bytes), then from Xin=948 to 1421 (the outer code data bytes), and segment 3 is read out in the sequence Xin=1968 to 1991 (the outer code check bytes), then from Xin=1422 to 1895 (the outer code data bytes).

FIG. 7 shows the sequence of read-out start addresses from the field memory of this embodiment, (i.e. for the case of a PAL standard video signal) as the field of one 8-field color frame are read out of the memory. In FIG. 7, each set of numbers of the form (Fld, Ch, Seg, $Xin_{st}$) respectively express the color frame number Fld of the field concerned, the channel number Ch (1 or 0), the number Seg of the segment that is to be read out, and the inner code block starting address from which read-out of the segment is to be started, with that starting address being designated as $Xin_{st}$. It can thus be seen that whereas for the channel 0 samples of the field having Fld=0, the starting address values $Xin_{st}$ are respectively as shown in FIG. 6; the starting address values in the case of the channel 0 samples of the field having Fld=1 are 59, 533, 1007 and 1481, for the segments 0, 1, 2 and 3 respectively.

In the case of reading out the channel 1 samples of a field for which the value of Fld is 0, since there is a fixed offset of 711 inner code block addresses between the start of reading out the channel 1 samples of a field and read-out of the channel 0 samples of that field, and since the channel 0 read-out (for segment 0) begins at the inner code block address 0, the channel 1 read-out start address $Xin_{st}$ will be 711, for segment 0. Similarly, the values of $Xin_{st}$ will be 1185, 1659 and 237 for the channel 1 segment 1, 2 and 3 respectively.

It can thus be understood that (except for the case of the channel 0 samples of a field for which Fld=0, as shown in FIG. 6), after the Xin address value 1895 has reached during read-out from the field memory, operation then proceeds to the Xin address 0, to thereafter read out the remainder of the outer code data bytes of the field.

It can further be understood that the three blocks into which each line of samples has been divided are written into respective ones of three block regions of the field memory, i.e. regions defined by the Col values 0 to 303, 304 to 607, and 608 to 911 in FIG. 6, and that each of the segments 0 to 3 consists of a plurality of sets of samples which are respectively read out from each of the aforementioned block regions. That fact, together with the fact with the present invention, shuffling is executed prior to dividing the samples into segments and with the prior art example of FIG. 1 the shuffling is executed after the samples have been divided into segments, basically distinguishes the operation of the present invention from the prior art example described above.

The values of the shuffling constants A, B and C and the modulo, used in equation (4) above, are selected such that within each of the three blocks into which a line of samples has been divided, after executing shuffling processing and writing that block into the field memory as described above, adjacent samples of the same line and same channel will be located in respectively different ones of the segments 0 to 3. They will thus be recorded on respectively different tracks of the magnetic tape.

Figure 8:
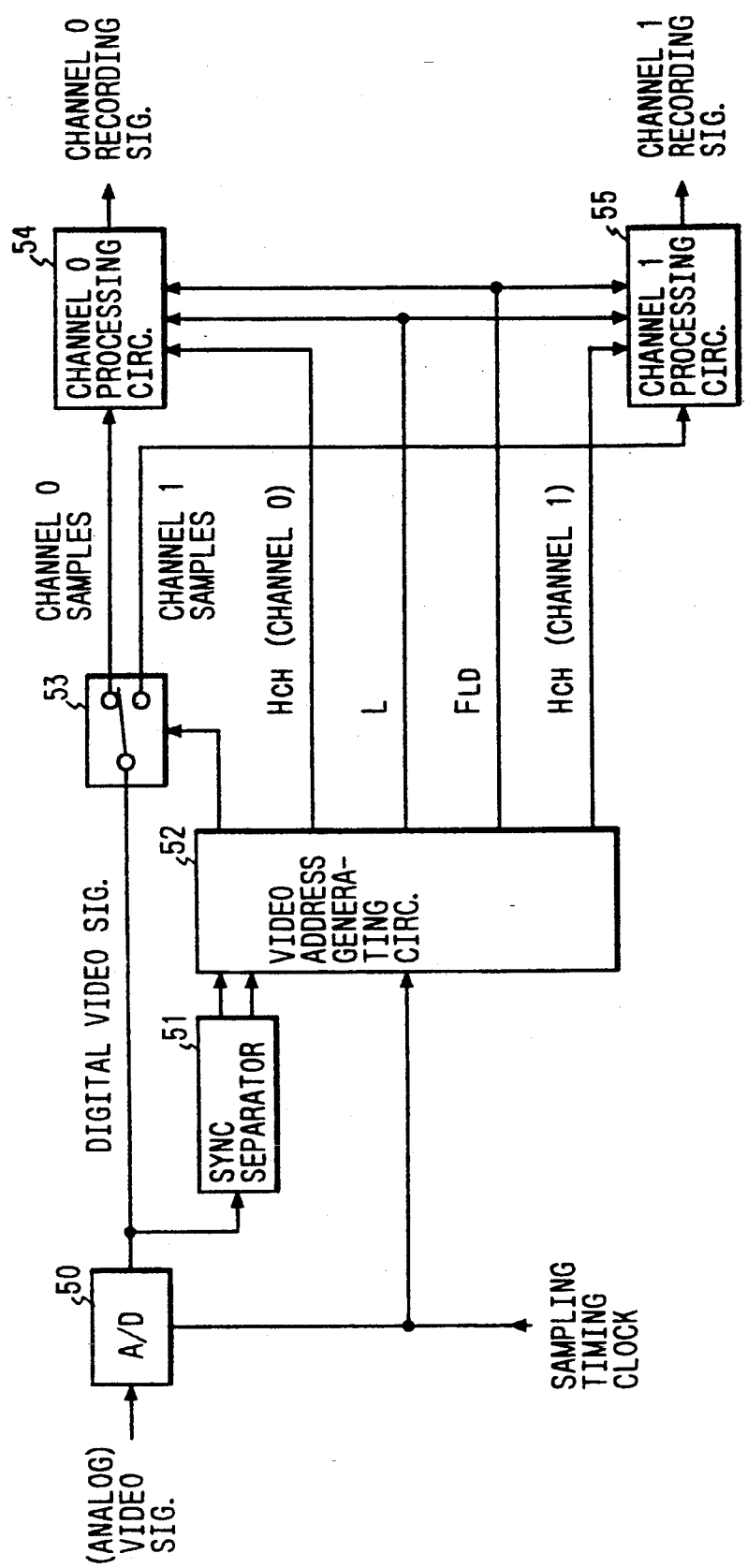
FIG. 8 is a general block diagram of signal processing circuits of a VTR incorporating a digital video signal processing apparatus according to the present invention.

FIG. 8 is a general block diagram of the signal processing circuits of a digital video signal VTR which incorporates a first embodiment of a data rearrangement apparatus for a digital video signal according to the present invention. It will be assumed that the digital video signal is derived by converting a PAL standard video signal to digital form. In FIG. 8, an analog color video signal is subjected to analog-to-digital conversion in an A/D converter 50, to obtain the digital video signal which is supplied to a sync separator circuit 51 in which the horizontal and vertical synchronizing signals of the video signal are extracted and supplied to a video address generating circuit 52, together with the sampling timing clock signal that determines the timings of generating the digital samples constituting the digital video signal. The digital video signal is also supplied to a switching circuit 53, for dividing the alternate samples of each line of the digital video signal into channel 0 and channel 1 samples, in response to a control signal generated by the video address generating circuit 52. For each sample of the digital video signal, the video address generating circuit 52 also generates a corresponding value of Hch, L, and Fld described hereinabove. The channel 0 samples from the switching circuit 53 are supplied together with the L and Fld values, and the Hch values for the channel 0 samples, to a circuit 54 which includes a field memory and in which the operations described hereinabove for dividing each line into three blocks, executing intra-block shuffling, generating check bytes, writing into the field memory, and reading out from the field memory are executed as described in detail hereinafter. The circuit 54 will be referred to in the following as the channel 0 processing circuit. The channel 1 samples that are outputted from the switching circuit 53 are similarly supplied to a channel 1 processing circuit 55 which executes similar operations to those of circuit 54, for the channel 1 samples, and which also receives the L and Fld values, as well as the Hch values for the channel 1 samples. The final output signals produced from circuits 54 and 55 are channel 0 and channel 1 recording signals, which are supplied to respective magnetic heads of a VTR (not shown). The aforementioned channel number Ch is equal to 0 for circuit 54, and equal to 1 for circuit 55, and is supplied to these as indicated.

Figure 9:
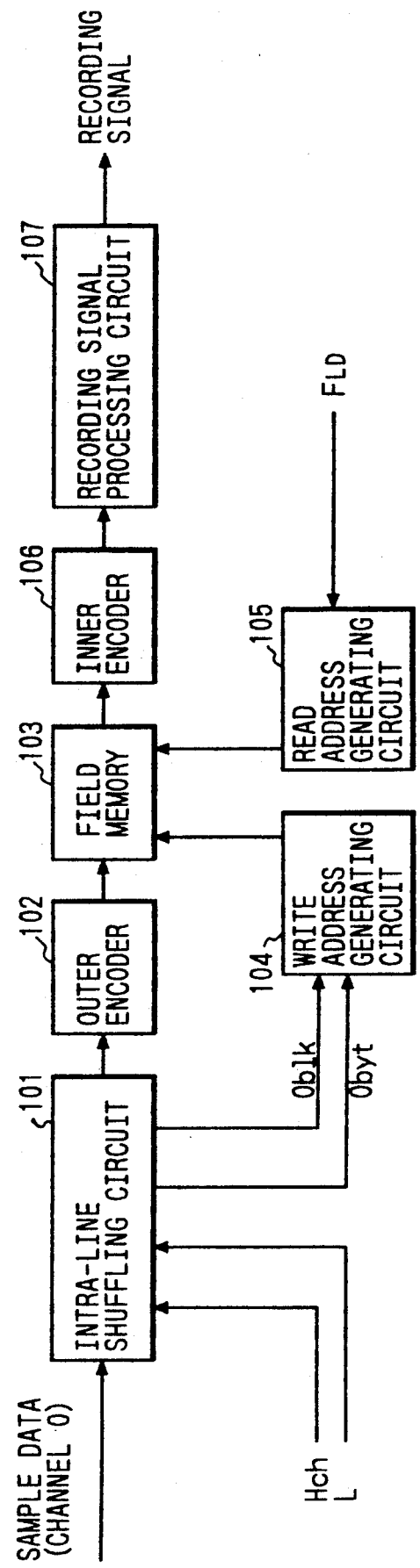
FIG. 9 is a block diagram showing the general configuration of a first embodiment of a digital video signal processing apparatus according to the present invention.

FIG. 9 is a block diagram showing the internal configuration of each of the channel 0 and channel 1 processing circuits 54 and 55 in FIG. 8, which in combination constitute a digital video signal data interchange apparatus according to the present invention. For the purposes of description, FIG. 9 will be assumed to show the channel 0 processing circuit 54. In FIG. 9, successive ones of the channel 0 samples of a field are supplied to an intra-line shuffling circuit 101. As each sample is supplied to circuit 101, values of Hch and L corresponding to that sample are also supplied to the circuit. Based on Hch and L, the intra-line shuffling circuit 101 divides each line of the channel 0 samples of the digital video signal into three blocks as described hereinabove, and executes shuffling of each block in accordance with equation (4) above, while at the same time generating for each sample a corresponding converted intra-block address value Obyt and block number Oblk. The block is then supplied to an outer encoder 102, which computes error detection check bytes for the shuffled block and and adds these check bytes to the end of the block, then supplies the result to be stored in a field memory 103, which can store an amount of data corresponding to at least a plurality of tracks of the magnetic tape. It will be assumed that in this embodiment the field memory 103 can store data of one channel of one field. A write address generating circuit 104 receives the Oblk and Obyt values generated by the intra-line shuffling circuit 101, and based on these, generates for each sample a corresponding 2-dimensional address in the field memory 103 (i.e. a Row and a Col address as described for FIG. 5 above), for writing that sample into the field memory 103. Each of the three blocks of a line of samples, with check bytes attached, is thereby written into the field memory 103. A read address generating circuit 105 receives the Fld value of a field that is to be read out from the field memory, together with the channel number (which is of course fixed as 0 in this case) and based on these generates successive inner code block addresses for read-out of samples from the field memory 103, with reading being executed as described hereinabove referring to FIG. 6. An inner encoder 106 adds respective error detection check bytes to the inner code blocks that are thus read out, and the resultant data are transferred through a recording signal processing circuit 107, as a channel 0 recording signal, to one of two recording heads. The sample and check byte data are thereby recorded on tracks of the magnetic tape, with one segment being recorded per track.

Figure 10:
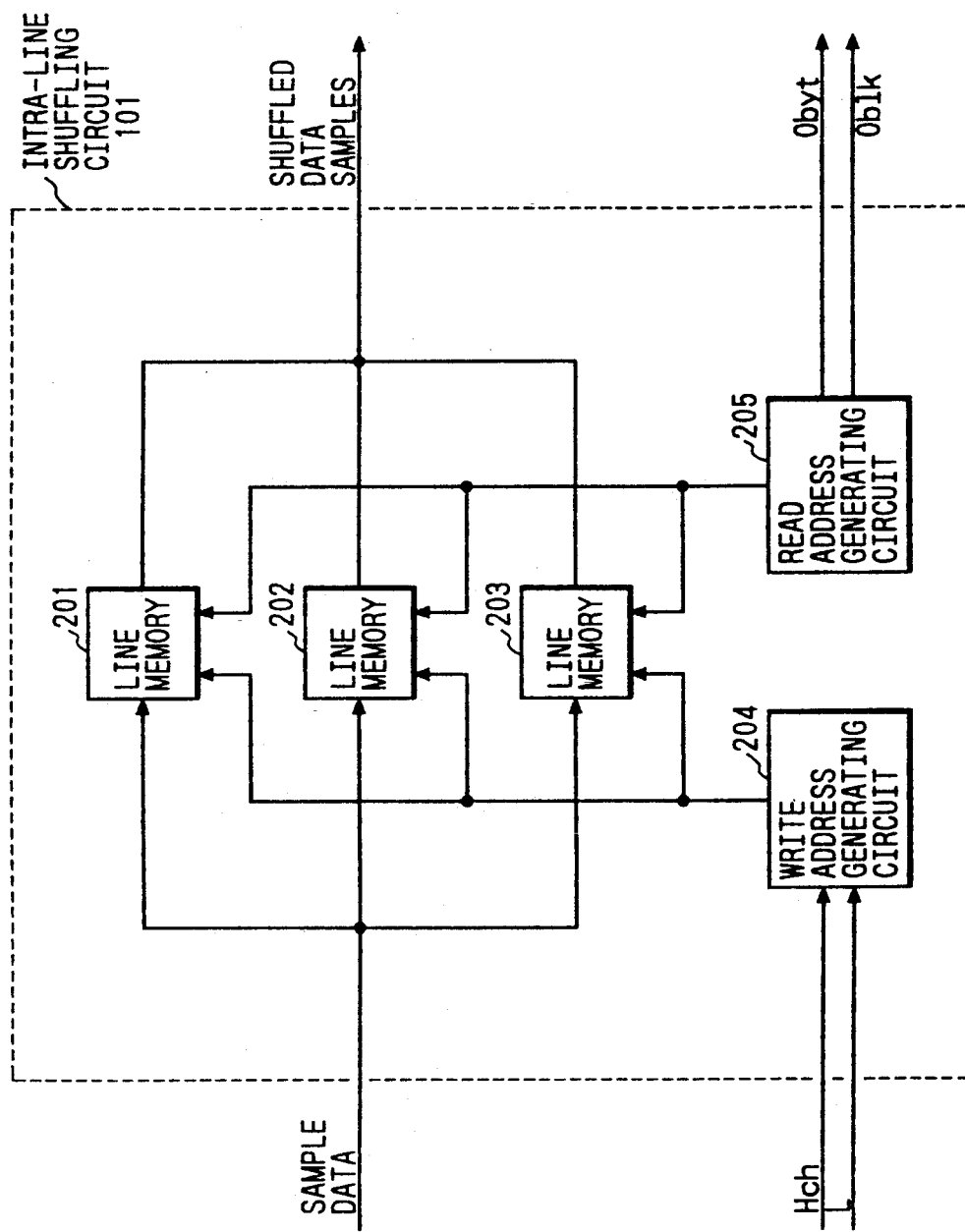
FIG. 10 is a block diagram of the internal configuration of an inter-line shuffling circuit in the first embodiment.

FIG. 10 shows the interval configuration of the intra-line shuffling circuit 101. Here, line memories 201, 202 and 203 function as respective buffer memories each of which stores one of the blocks into which each line of the digital video signal is divided. As each sample is supplied to the intra-line shuffling circuit 101, a write address generating circuit 204 receives corresponding Hch and L values as video address information specifying the position of that sample in the field, and based on these selects one of the line memories 201 to 203 for writing in that sample and generates an address for writing that sample into the selected line memory. A read address generating circuit 205 generates addresses for reading out the samples from the line memories 201 to 203, and as each sample is read out, outputs corresponding Oblk and Obyt values to respectively designate the block to which the sample belongs and the position of the sample within that block.

The selection of one of the line memories 201 to 203 for having an sample written therein is based upon equation (2) above. For example each sample for which Oblk is 0 will be stored in the line memory 201, each sample with Oblk=1 will be stored in line memory 202, and each sample for which Oblk=2 will be stored in the line memory 203. Generation of addresses for writing the samples into the line memories 201 to 203 is executed by the write address generating circuit 204, such that each sample is written into one of the line memories 201 to 203 at an address corresponding to the value of Obyt that is computed for that sample. For example in the case of a sample for which Oblk=2 and Obyt is calculated as 4, the sample will be written into the fifth address of the line memory 203, since these line memory addresses extend successively from 0 to 157. These values of Obyt are generated by the write address generating circuit 204 in accordance with equation (4) above.

The read address generating circuit 205 generates read addresses for the line memories 201 to 203 sequentially, in the sequence 201, 202, 203, and addresses for reading out samples successively from each line memory. Reading out of the samples from each of the line memories 201 to 203 begins at the sample for which Obyt=0, and so on for successively incremented values of Obyt. until the last Obyt value (i.e. 157) is reached, whereupon read-out from the next line memory begins.

In FIG. 9, an outer encoder 102 receives each of the blocks of samples into which a line of samples has been divided by the intra-line shuffling circuit 101, as the block is read out from the corresponding one of the line memories 201 to 203 in the intra-line shuffling circuit 101 and written into the field memory 103, and calculates a set of 8 error detection check bytes for that block. The error detection check bytes are then appended to the end of the block and written into the field memory 103.

Based on the Oblk and Obyt values supplied thereto, the write address generating circuit 104 generates corresponding (Row and Col) addresses for writing each block (with appended error detection check bytes) into the field memory 103, with these address values being calculated based on equations (5) and (6) above.

Figure 11:
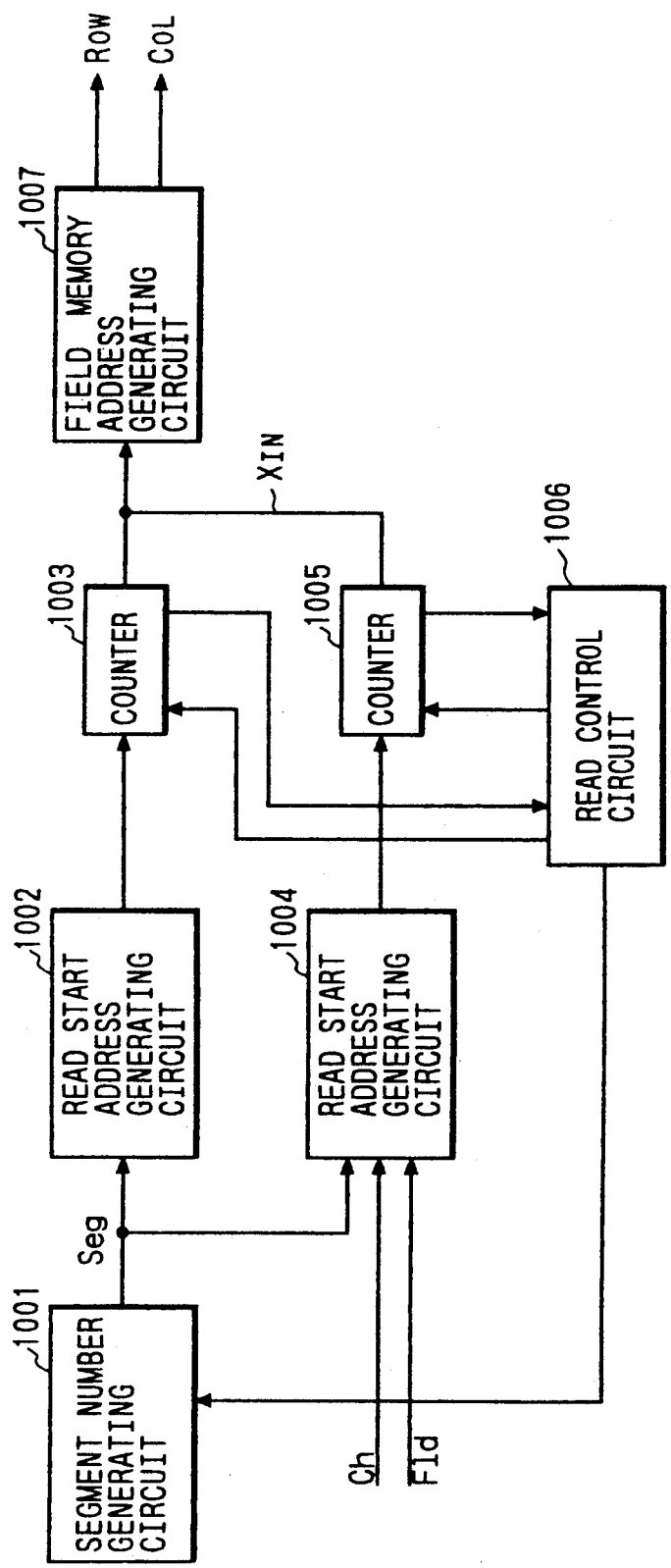
FIG. 11 is a block diagram showing the internal configuration of a memory read address generating circuit in the embodiment of FIG. 9.

When all of the samples of one channel (in this example, channel 0) of the field have been written into the field memory 103 using the addresses generated by the write address generating circuit 104 in this way, the samples are then read out from the field memory 103 using addresses that are generated by the read address generating circuit 105. FIG. 11 shows the internal configuration of the read address generating circuit 105, in which a segment number generating circuit 1001 successively generates segment numbers for memory read-out, i.e. the values of Seg described hereinabove. A write address generating circuit 1002 generates inner code block read (Xin) start addresses for the outer code check bytes. These start address values are the same for every field and for each of the channels, i.e. are determined only by the number of the segment that is to be read out, so that only the Seg values are supplied to circuit 1002.

A counter 1003 receives each start address thus produced, and generates corresponding (inner code block unit) read-out addresses for the outer code check bytes, i.e. successive values of Xin described hereinabove. A read address generating circuit 1004 receives the Seg, Ch and Fld values, and based on these generates an inner code block read start address for the outer code data bytes of each segment. A counter 1005 receives each start address thus produced, and generates corresponding inner code block read addresses for the outer code data bytes of each segment. A read control circuit 1006 controls the operation of the counters 1003 and 1005. A field memory address generating circuit 1007 converts each inner code block (Xin) address value into a corresponding set of successive (Row and Col) addresses in the field memory 103.

The sequence of generating read addresses begins with the generation of a segment number by the segment number generating circuit 1001, i.e. a value of Seg in the range 0 to 3. When that segment number is generated, the write address generating circuit 1002 then executes computations in accordance with equation (9) above to obtain a starting address for reading out the outer code check bytes of the corresponding segment in units of inner code blocks. That start address is sent to the counter 1003. In addition the read address generating circuit 1004 executes computations in accordance with equation (10) above to obtain a starting address for reading out the outer code data bytes of that corresponding segment in inner code block units. That start address is sent to the counter 1005. The read control circuit 1006 first sets the counter 1003 in operation (after the start address has been sent thereto), so that the outer code check bytes of that segment will be read out first, as described hereinabove referring to FIG. 6.

The counter 1003 generates the inner code block unit addresses within that segment sequentially, starting from the start address that was generated by the write address generating circuit 1002. There is a total of 24 inner code blocks constituting the outer code check bytes of one segment, so that for example the outer code check bytes of segment 0 are assigned the inner code block addresses 1896 to 1919 in FIG. 6 (i.e. for the case of the channel 0 samples of the field having Fld=0). As each inner code block address is supplied to the address generating circuit 1007, the (Row and Col) address values for the samples of that inner code block are generated by circuit 1007, and the block is read out and transferred via the inner encoder 106 to the recording signal processing circuit 107. When generation of the inner code block addresses for the outer code check bytes of one segment has been completed, a termination signal is sent to the read control circuit 1006, which then sets the counter 1005 in operation, to begin reading out the first outer code data bytes of that segment. For example, that read-out starts from the inner code block address 0 in the case of segment 0 of the channel 0 samples of the field for which Fld=0, as shown in FIG. 6. The counter 1005 thereafter generates successive inner code block addresses for reading out the remaining outer code data bytes of that segment, following the starting address that has been supplied from the read address generating circuit 1004. There is a total of 474 inner code block units for the outer code data bytes of one segment, e.g. these having the inner code block addresses 0 to 473 in the case of segment 0 of the channel 0 samples of the field for which Fld=0, as shown in FIG. 6. When generation of inner code block read addresses for the outer code data bytes of one segment has been completed, an address generation termination signal is sent to the read control circuit 1006, which respond by sending a command signal to the segment number generating circuit 1001, requesting that the inner code block start address of the outer code check bytes of the next segment be generated (e.g. the address 1920 for segment 1, in the example of FIG. 6).

The above address generating operations of the counters 1003, 1005 are continued until the inner code block address 1995 is reached. In the specific case shown in FIG. 6, i.e. the channel 0 samples of the field for which Fld=0, 1995 is the final inner code block address of segment 3, so that read-out of the samples of that field has then been completed. However in the case of a field for which Fld has a value other than 0, the read address generating circuit 1004 will have generated an inner code block start address for the outer code data bytes (of segment 0) that is greater than 0, so that the inner code block address 1995 will not be the final address of segment 3, and in that case read-out from inner code block address 0 is then executed after Xin=1995 has been reached, and so on until the last outer code data byte of that segment has been reached.

The samples that are thus read out in units of inner code blocks are supplied to the inner encoder 106, in which an error detection check byte is added to each inner code block unit. After the samples for one segment have been processed by the recording signal processing circuit 107, these are written onto one track of the recording medium, which in this embodiment is magnetic tape.

The above description applies to the field shuffling that is executed in the case of a PAL standard video signal. The requirements for optimum values of the shuffling constants A, B, C in equation (4) above are as follows. Considering any set of adjacent samples of the same line and same channel (as defined hereinabove and illustrated in FIG. 3) of the digital video signal prior to executing field shuffling, the shuffling constants must be selected such that any two samples that are of the same line and same channel (e.g. samples 901 and 903, or samples 903 and 905) will be written into respectively different segments of the field memory 103. Since the segments are recorded on respectively different tracks of the recording medium, this ensures that the central one of the three samples will be recorded on a different track from the two outer samples. Examples of suitable values for the shuffling constants in the case of a PAL standard video signal are as follows:

$$(A,B,C)=(59,72,155)$$

Figure 12:
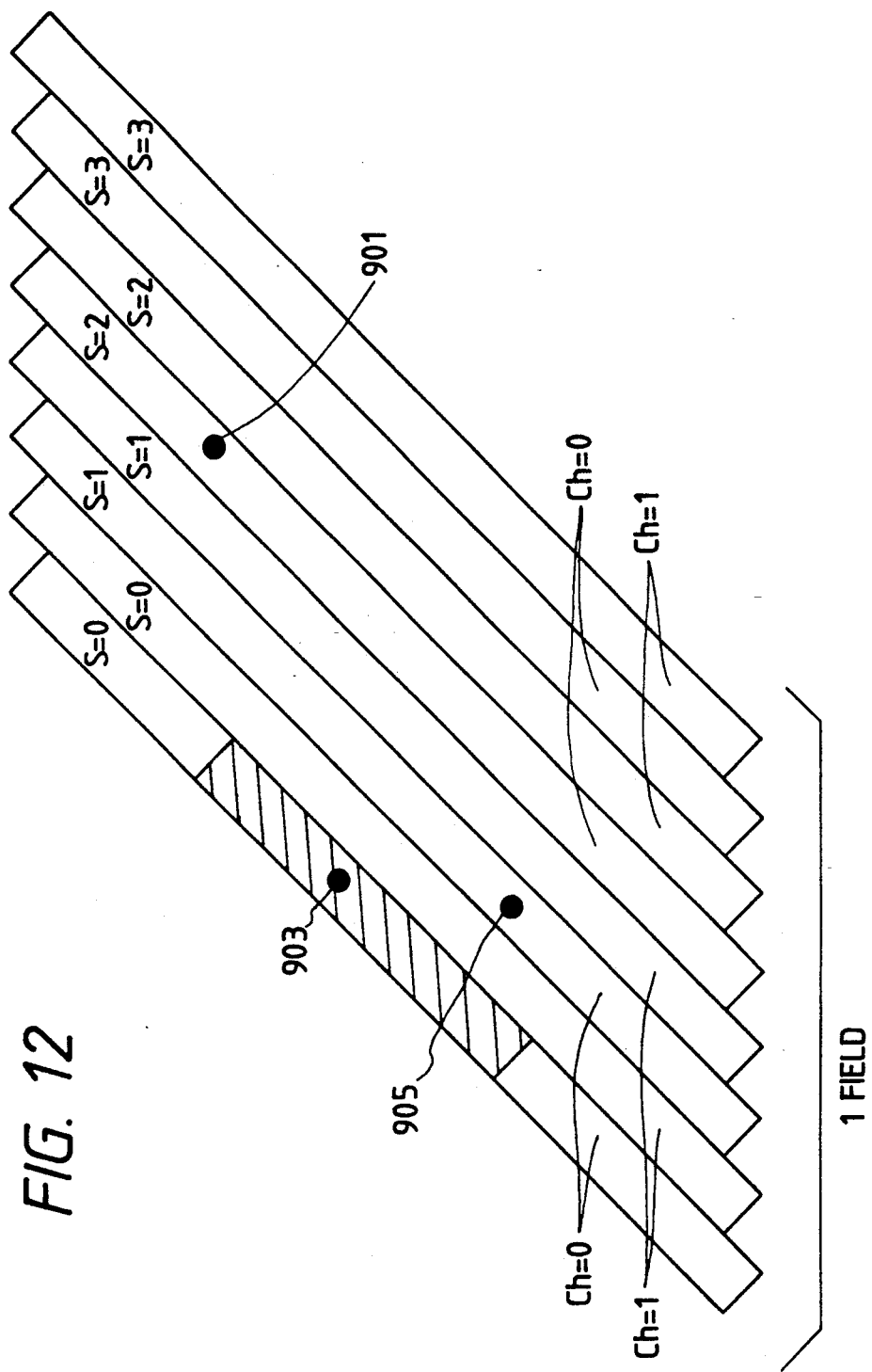
FIG. 12 shows an example of a track pattern on a magnetic recording tape, for the case of a PAL standard digital video signal.

FIG. 12 shows an example of a track pattern on a magnetic recording tape, produced by the embodiment of the present invention described above (i.e. for the case of a PAL standard video signal). One channel of a field of the video signal has been divided into four segments after shuffling processing, as described above, with each segment being recorded on a corresponding one of the diagonal tracks of the magnetic tape. That is to say, since each field is divided into two channels, there is a total of 8 tracks per field.

Figure 2:
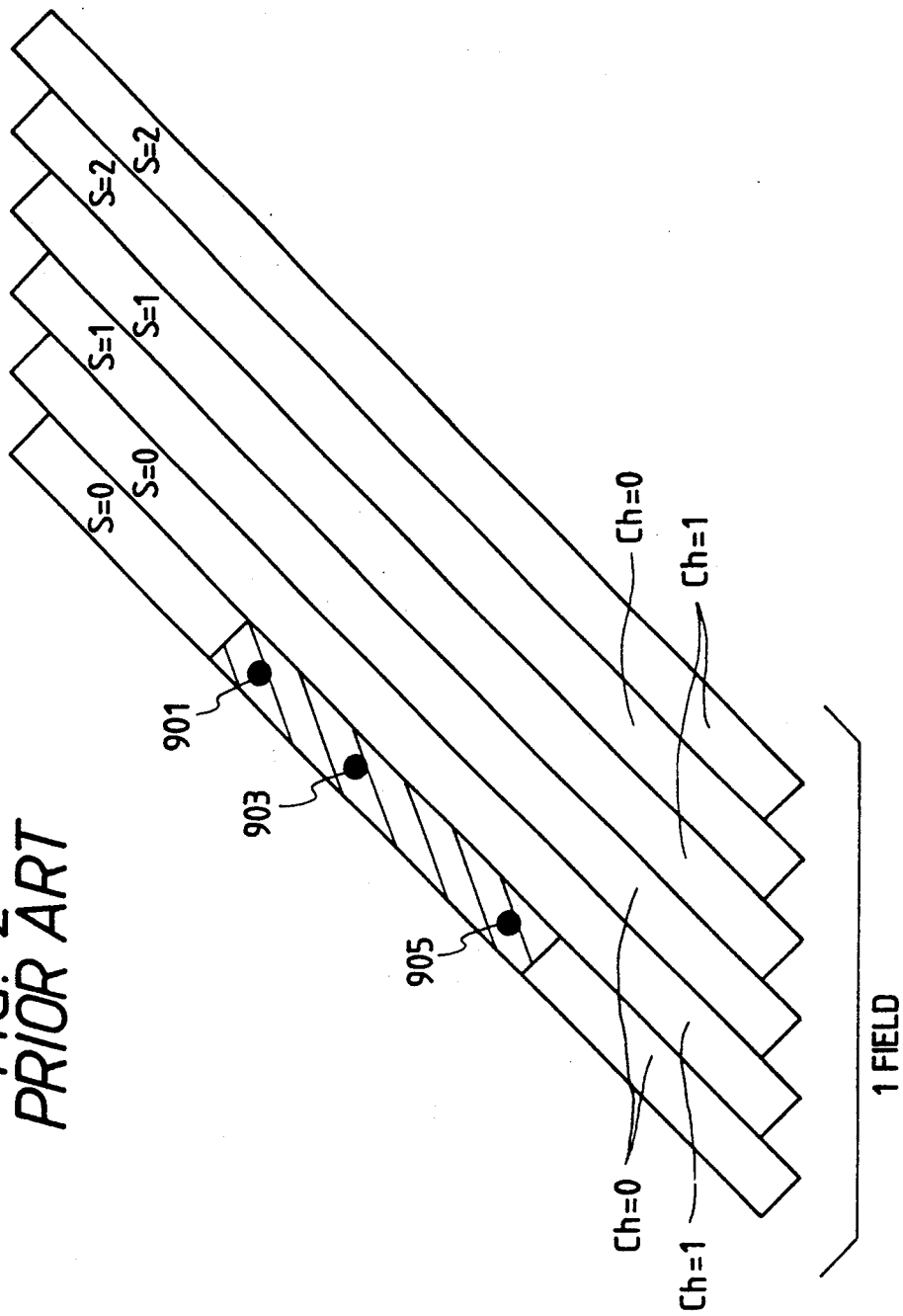
FIG. 2 is an example of a track pattern diagram for the prior art apparatus.
Figure 3:
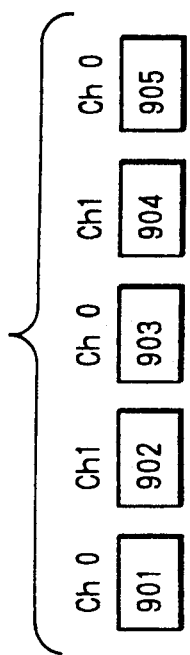
FIG. 3 is a diagram showing five successive samples of one line of a digital video signal.

The effects obtained by the present invention will be described referring to FIG. 12. In that example, 901, 903 and 905 designate three successively adjacent samples of the same line and same channel, as shown in FIG. 3 described hereinabove. However as a result of the field shuffling operation that has been executed as described above, the central one (903) of these three samples is recorded on a different track of the magnetic tape from the outer pair of samples (901, 905). It will be assumed that a long-duration burst error has occurred along one of the tracks, as indicated by the hatched-line portion in FIG. 12. A number of samples consecutively recorded on that track, including the sample 903, have thereby been lost. However since the samples 901 and 905 are recorded on different tracks, they are not affected by that burst error, and so can be subsequently used in "retouching" processing to compensate for the lost sample 103. It will be apparent that the same will be true for all of the other samples which have been lost as a result of that burst error. For each of these other samples, considering the sample as the central one of three adjacent samples of the same line and same channel, the outer pair of samples of the three will have been recorded on tracks other than that of the burst error, so that these will be available for use in "retouching" compensation processing. Hence, it will always be possible to achieved optimum compensate for any samples which are lost as a result of an isolated burst error occurring in a single track, irrespective of the duration of that burst error along the track.

Figure 13:
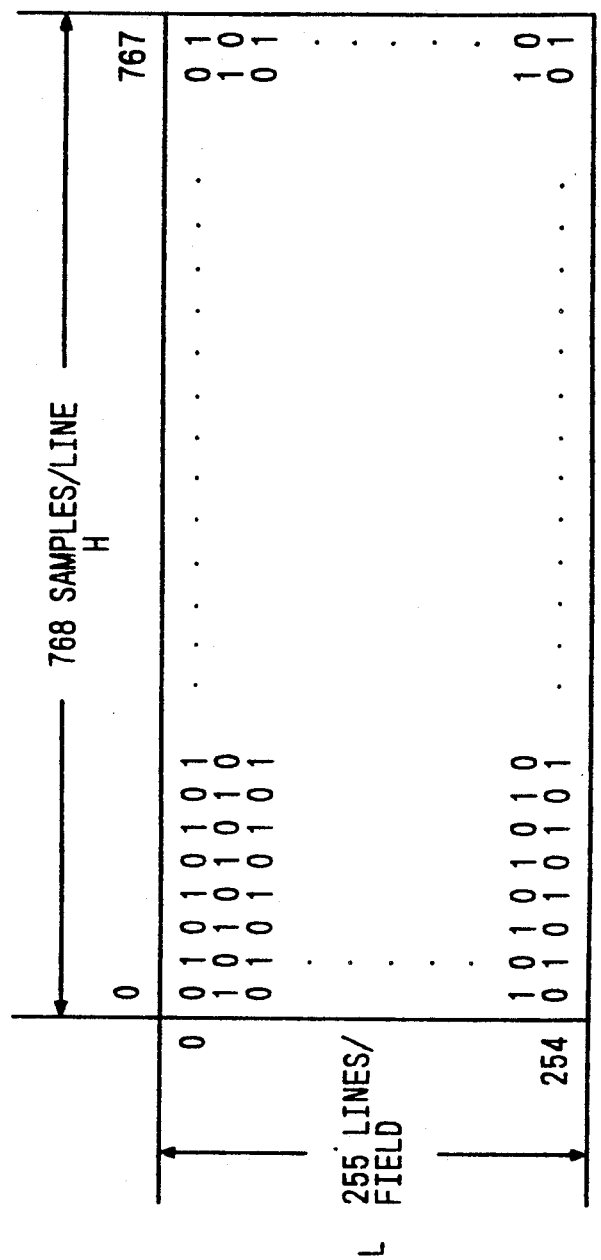
FIG. 13 is a diagram for illustrating how samples are addressed within a field, based on line numbers, sample numbers and channel numbers, with a second embodiment of the invention, applied to an NTSC standard digital video signal.

Although the above description has been given for the case of a PAL standard video signal, similar results can be obtained in the case of an NTSC standard video signal. A second embodiment of the present invention will be described, which is applicable to an NTSC video signal. FIG. 13 shows the distribution of the channel 0 and channel 1 samples of an NTSC video signal that has been converted to digital form, in one field of that signal. In this case, the line numbers L take the values {0, 1, ..., 254} and the sample numbers H in a line take the values {0, 1, ..., 767}. H and Hch are related as follows:

$$Hch = int\ (H/2) \qquad (11)$$

Thus Hch takes the values {0, 1, ..., 383}, with this embodiment. For example if H=767, then Hch=383.

Figure 14:
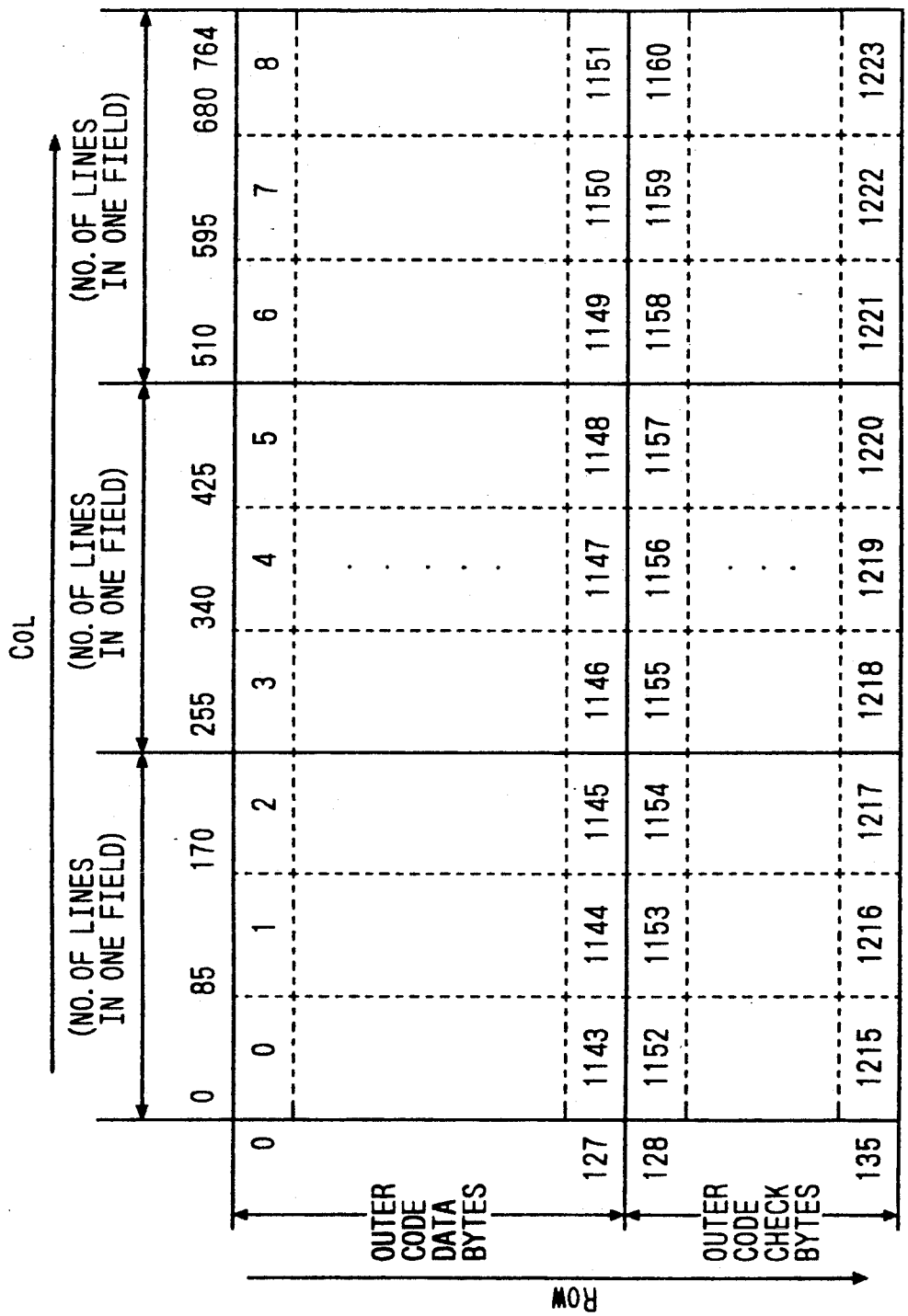
FIG. 14 is a diagram illustrating the logical configuration of a field memory used in the second embodiment, for the case of an NTSC standard digital video signal.

FIG. 14 shows the logical configuration of the field memory of this embodiment. As for the first embodiment described above, the address of each byte stored in the field memory is expressed 2-dimensionally by a Col value and a Row value, these values increasing respectively along the horizontal direction and the vertical direction as seen in FIG. 14. It will again be assumed that processing of the channel 0 samples of a field of the digital video signal is described, and that the field has a value of 0 for the color frame number Fld. The maximum Row value is $\frac{1}{3}$ of the maximum value of Hch, with 8 added thereon corresponding to the outer code check bytes. Similarly, the maximum value of Col is 3 times the maximum value of L. Thus Row takes the values {0, 1, ..., 135} and Col takes the values {0, 1, ..., 764}.

One line of samples is divided into 3 blocks, as for the first embodiment, based on equation (12) below:

$$Oblk = Hch\ mod\ 3 \qquad (12)$$

Thus Oblk takes the values {0, 1, 2}. For example, if a sample has the value 303 for Hch, then the value of Oblk for that sample is 2.

As for the first embodiment, addresses of samples within a block are defined as Hd, where the relationship between Hd and Hch is as follows:

$$Hd = int\ (Hch/3) \qquad (13)$$

Hence, Hd takes the values {0, 1, ..., 127}. For example of Hch=383, then Hd=127.

Shuffling is executed mutually separately within each of the three blocks into which a line of samples is separated, by address conversion, as for the first embodiment. The new address value for each sample, again designated as Obyt, is derived based on three shuffling constants designated as A, B and C as follows:

$$Obyt = A*Hd + B*Oblk + C*L\ mod\ 128 \qquad (14)$$

Obyt thus takes the values {0, 1, ..., 127}, i.e. 128 Row address values for writing the samples of a block into the field memory are obtained as these 128 Obyt values. That is:

$$Row = Obyt \qquad (15)$$

An error detection check byte is added after each block, and written into memory using the eight Row address values {128, 129, ..., 135}.

The Col address value for writing into memory each block, with check bytes added, is obtained as follows:

$$Col = 255*Oblk + L \qquad (16)$$

The above operation of deriving Row and Col addresses is executed successively for each of the blocks into which a line has been divided, and for all of the lines of the field.

As shown by equation (16), the (channel 0) samples of the 255 lines of a field are divided into three sets of 255 blocks when written into the field memory, as seen in FIG. 14, in the same way as for the first embodiment. The sample data bytes in the field memory (i.e. which have Row addresses from 0 to 127 in the case of the channel 0 samples of the field for which Fld=0, shown in FIG. 14) will be referred to as the outer code data bytes. The check bytes (having the Row addresses from 128 to 135 in FIG. 7) will be referred to as the outer code check bytes.

Figure 15:
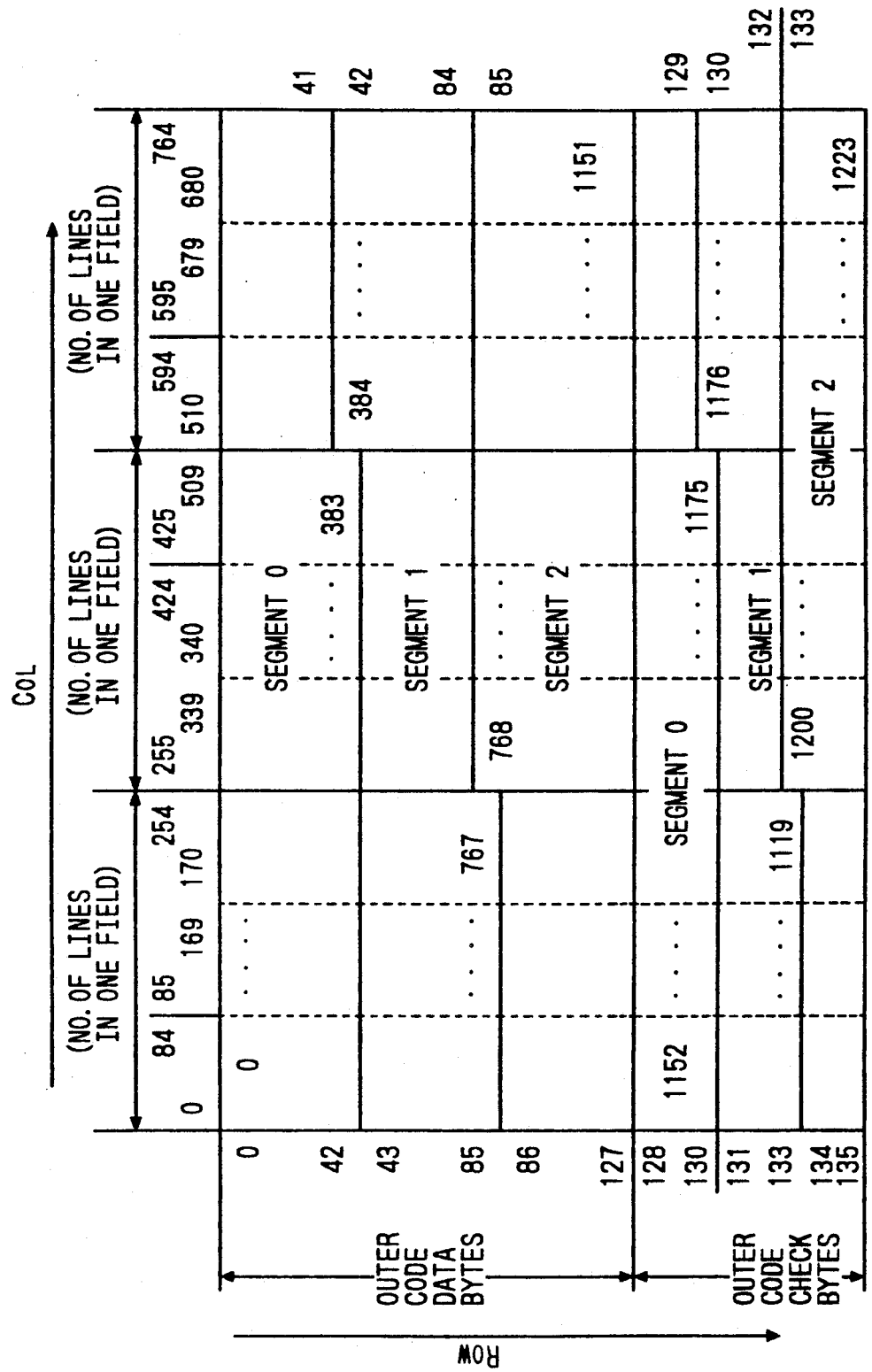
FIG. 15 is a diagram illustrating a method of reading out from the field memory, corresponding to FIG. 14, for the case of an NTSC standard digital video signal.

On completion of storing all of the samples of one field and one channel into the field memory, read-out from the field memory begins. Writing into the field memory is executed in the Row direction, i.e. the vertical direction as seen in FIG. 14, and reading out is executed in the Col direction, i.e. the horizontal direction as seen in FIG. 14. FIG. 15 shows an example of how read-out from the field memory of FIG. 14 is executed (FIG. 15 showing the same memory and same contents as does FIG. 14). As for FIG. 14, it is assumed in FIG. 15 that the channel 0 samples of the field for which Fld=0 have been written into the field memory.

This embodiment differs from the first embodiment described above, in that the samples of one channel of a field stored in the field memory are divided into 3 segments after field shuffling has been executed, with these segments being recorded on 3 respective tracks of the magnetic tape. These segments are designated by segment numbers 0, 1 and 2 in FIG. 15, respectively. The outer code data bytes are distributed among these three segments, with each segment being read out from the field memory in the direction of increasing Col numbers. As for the first embodiment, the check bytes of a segment are read out first (e.g. the bytes having the Row address 128, for segment 0 in FIG. 15), followed by the data bytes of that segment which have the lowest value of Row address (e.g. the bytes having the Row address 0, in segment 0), and so on, until the last data byte of the segment has been read out. That process is then repeated for the next segment.

Read-out is executed in inner code block units, of 85 bytes. As for the first embodiment, one-dimensional addresses Xin are assigned to these inner code block units for the purpose of read-out, these being numbered from 0 to 1223 in FIG. 15. The Xin values are related to the Row and Col values by the following equations:

$$Xin = Row * 9 + Cin \quad (17)$$

where:

$$Cin = int \, (Col/85) \quad (18)$$

In FIGS. 14 and 15 (for the case of Ch=0 and Fld=0) the Xin values 1152 to 1223 are those of the outer code check bytes, while the Xin values 0 to 1151 are those of the outer code data bytes.

For each segment, the starting address for read-out of the outer code check bytes of that segment is obtained as:

$$Xin = 1152 + 24 * Seg \quad (19)$$

In the above, Seg denotes the segment number within the field.

The starting address for read-out of the outer code data bytes of the segment is obtained as:

$$Xin = (384 * Seg + 96 * Fld + 576 * Ch) \bmod 1152 \quad (20)$$

Fld denotes the sequence number of the field within a color frame, and Ch is the channel number. Seg takes the values {0, 1, 2}, Fld takes the values {0, 1, 2, 3}, and Ch takes the values {0, 1}. As will be clear from equations (9) and (10), an offset with respect to the value 0 is established for the first Xin address from which read-out of the outer code data bytes begins. In the example of FIG. 15 that offset is zero, since the values of Seg, Fld and Ch are all zero in the case of segment 0 of the channel 0 samples of the first field of the color frame, which is assumed to be the case in FIG. 15. Thus the starting value of Xin for read-out of the outer code data bytes of is 0, and the final Xin value is 1151.

It can thus be understood that the sequence of reading out a field from the field memory with this embodiment is as follows:

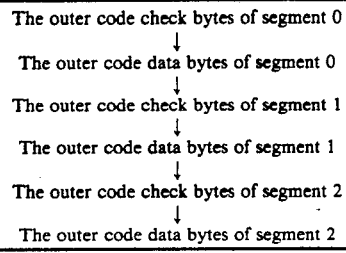

Thus in the case of FIG. 15, which is for the case of a field for which Fld is 0 and the channel number Ch is also 0, the segment 0 is read out in the sequence of Xin values from 1152 to 1223 (the outer code check bytes), then from Xin=0 to 383 (the outer code data bytes). The segment 1 is then read out in the sequence Xin=1176 to 1119 (the outer code check bytes), then from Xin=384 to 767 (the outer code data bytes). Similarly, segment 2 is read out in the sequence Xin=1200 to 1223 (the outer code check bytes), then from Xin=768 to 1151 (the outer code data bytes).

As described for the first embodiment, if all of the data of the field have not yet been read out when the inner code block address 1151 is reached, the operation proceeds to Xin=0, and the remaining data of the field are then read.

The circuit of this embodiment is substantially identical to that of the first embodiment described above, being basically as shown in FIG. 9. Each line (of samples of one channel) of the digital video signal is divided into three blocks by the intra-line shuffling circuit 101 having the circuit of FIG. 10, with each sample of the digital video signal being written into one of the line memories 201, 202 or 203 as selected by the write address generating circuit 204, in accordance with whether a value of Oblk of 0, 1 or 2 is calculated by the write address generating circuit 204 for that sample in accordance with equation (12) above. In addition, the write address generating circuit 204 generates a value of Obyt for each sample in accordance with equation (14) above, which determines the address at which the sample will be stored in the selected one of the line memories. The read address generating circuit 205 generates addresses for reading out the samples from each of the line memories, in the sequence line memory 201, line memory 202 and line memory 203, beginning from the initial address (Xin=0) of line memory 201, in the same way as described for the first embodiment. The values of Obyt and Oblk thus established for each sample are supplied to the write address generating circuit 104, which thereby generates a corresponding (Row and Col) 2-dimensional address for storing the sample in the field memory 103, with that address being generated based on equations (15) and (16) above. When all of the samples of one of the line memories have thus been written as a block into the field memory 103, the outer encoder 102 calculates a set of 8 error detection check bytes which are then written into the field memory 103, as outer code check bytes, at addresses which are also generated by the write address generating circuit 104.

When all of the (e.g. channel 0) samples of that field have thus been stored in the field memory, read addresses are generated by the read address generating circuit 105 for reading out the sample and check byte data in inner code block units as described for the first embodiment, with the configuration of the read address generating circuit 105 being as shown in FIG. 11. The segment number generating circuit 1001 first generates a segment number, whereupon the write address generating circuit 1002 generates an inner code block address for reading out the first outer code check bytes, and that address is sent to the field memory 103. The read address generating circuit 1004 similarly generates the address for reading out the first outer code data bytes, as a first outer code byte unit, and sends that starting address to the counter 1005. The read control circuit 1006 then controls the counter 1003 to begin generation of addresses first, so that the outer code check bytes of that segment are read out first. The inner code block addresses (i.e. Xin values) for these outer code check bytes are then generated sequentially, from the aforementioned first address.

Upon completion of generating the inner code block addresses for the outer code check bytes of a segment, an address generation termination signal is sent to the read control circuit 1006, which then sets the counter 1005 in operation, to begin generating the inner code block addresses for the outer code data bytes of that segment. These addresses are then sequentially generated, beginning from the aforementioned starting address for the outer code data byte read-out. Upon completion of generating these inner code block addresses for the outer code data bytes of the segment, an address generation termination signal is sent to the read control circuit 1006 from the counter 1005, whereupon the read control circuit 1006 sends a request to the segment number generating circuit 1001 for the next segment number.

The counters 1003 and 1005 continue to output successive inner code block addresses until the address 1151 (shown in FIG. 15) is reached. For the example shown in FIG. 15, i.e. read-out of the channel 0 samples of a field for which Fld=0, the inner code block add 1151 is the final address of the field. However for any other value of Fld, there will be outer code data bytes remaining which have yet to be read out, so that after address 1151, the inner code block address 0 will be generated, and the remaining channel 0 data of the field will then be read out.

As for the first embodiment, the field memory address generating circuit 1007 converts each of the inner code block addresses produced from the counters 1003 and 1005 into a corresponding set of 2-dimensional addresses (Row and Col) of the field memory 103, and sends these to the field memory.

The operation of the inner encoder 106 and recording signal processing circuit 107 is as described for the first embodiment, i.e. each segment (with added check bytes) of the channel 0 data of a field, or of the channel 1 data, being recorded on one track of the magnetic tape.

The values of shuffling constants A, B and C used in equation (14) above are determined such that samples of the same line and same channel are written into respectively different ones of the segments 0, 1, 2. Thus, considering any three adjacent samples of the same line and same channel such as the samples 901, 903 and 905 shown in FIG. 3, it is ensured that the central one (903) of these three samples and the outer pair of samples (903, 905) will be written into respectively different segments in the field memory 103, and so will be recorded on respectively different tracks of the magnetic tape, since one segment is recorded per track. However in addition, the shuffling constants are determined such as to ensure that with this embodiment (i.e. for the case of recording a NTSC standard video signal), that adjacent samples of the same line and same channel are written into adjacent ones of the segments 0, 1, 2. This ensures that the central one of the three adjacent samples and the outer pair of samples will be recorded by mutually different recording heads. Thus for example if the central one (903) of the aforementioned three samples (901, 903, 905) of the same line and channel is written into segment 0 of the field memory, both of the outer pair of samples (903, 905) are written into segment 1. Suitable values for the shuffling constants of this embodiment to achieve such operation are:

$$(A, B, C) = (107, 78, 40)$$

Figure 18:
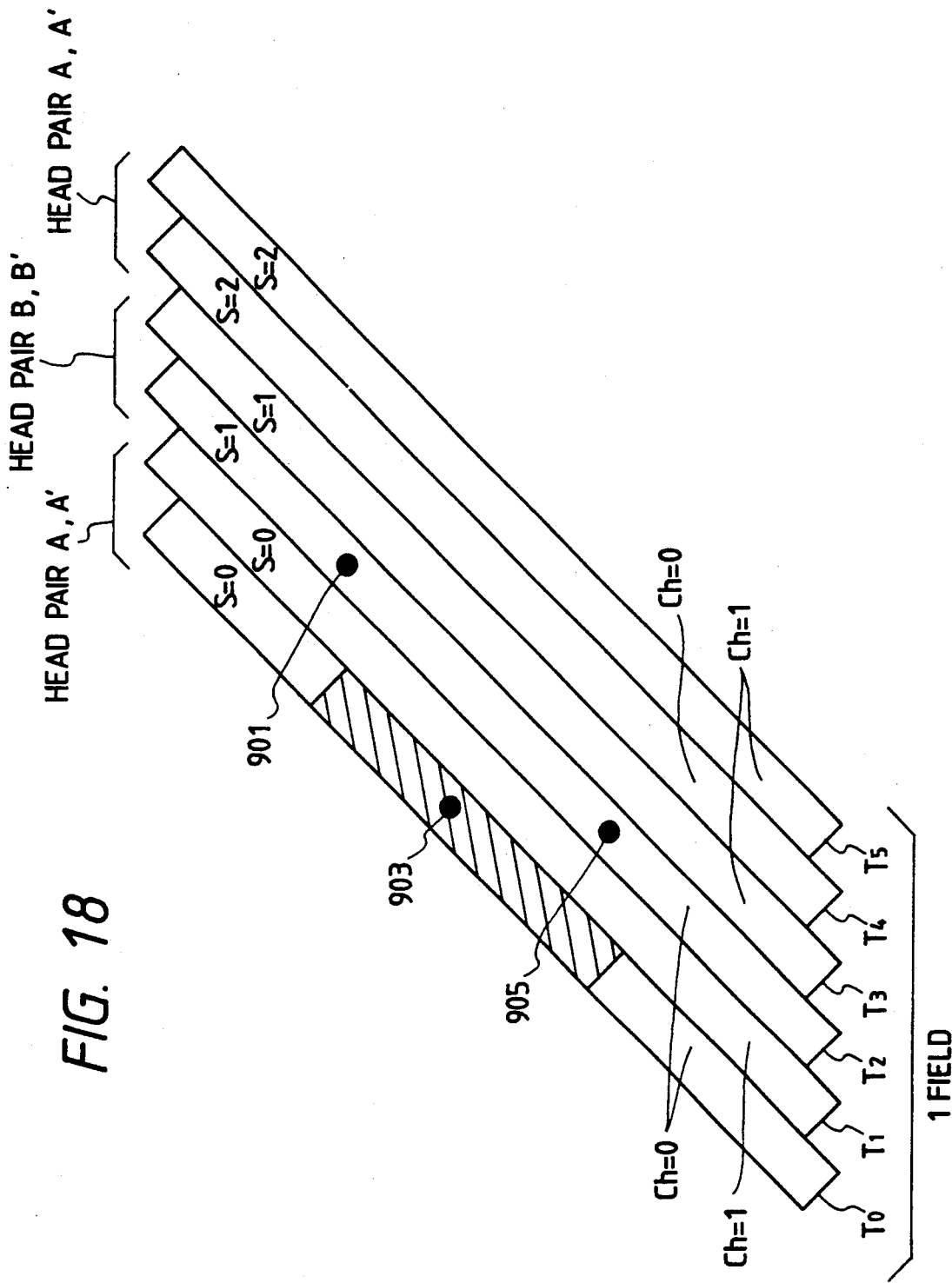
FIG. 18 shows an example of a track pattern on a magnetic recording tape, for the case of an NTSC standard digital video signal.

The above point will be explained referring to the recording track pattern example of FIG. 18, which is for the case of recording an NTSC digital video signal by the second embodiment of the present invention, and the previously described pattern of FIG. 12. With a PAL standard video signal digital VTR, two heads are mounted on the head cylinder of the VTR, spaced apart by 180°, so that successive diagonal tracks are recorded by alternate ones of the two heads. Hence, referring to FIG. 12, all of the channel 0 tracks are recorded by one of the heads, and all of the channel 1 tracks are recorded by the other head. Hence, if for example the burst error shown by the hatched-line portion in FIG. 12 is caused by a dust particle which is momentarily adhering to the head gap of one of the heads, then there is a possibility that the particle will remain adhering to the head as two or more successive tracks are traced out by that head. In that case, long-duration burst errors could occur for example in the tracks containing the samples 901 and 905, in addition to that containing the sample 903. However with the second embodiment of the present invention, applied to an NTSC digital video signal, such a possibility is eliminated due to the fact that of any three adjacent samples of the same line and same channel such as samples 901, 903 and 905, the central sample (903) and the outer pair of samples (901, 905) will be recorded by respectively different heads.

Figure 16:
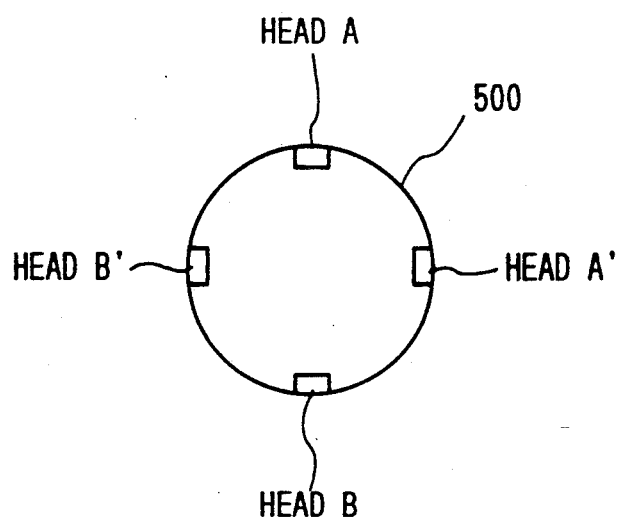
FIG. 16 is a diagram showing positions of heads on a head cylinder of a digital VTR for recording an NTSC standard digital video signal.
Figure 17:
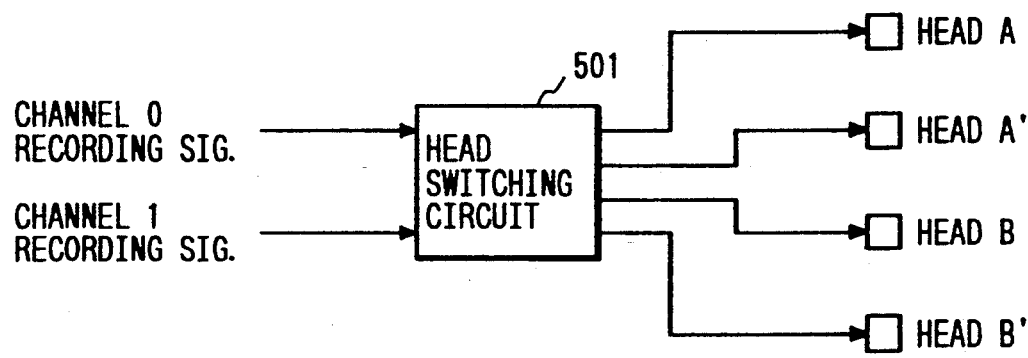
FIG. 17 is a block diagram showing a head switching circuit for transferring recording signals to the heads shown in FIG. 16.

Specifically, with an NTSC format digital VTR, two pairs of heads are used, these being shown in FIG. 16 as the pair of heads A and A' and the pair B and B', which are mounted on a head cylinder 500. A head switching circuit 501 shown in FIG. 17 serves to selectively transfer the channel 0 and channel 1 recording signals which are generated by the second embodiment of the invention as described above, to the heads A, A' and B, B' The head switching circuit 501 (and the write address generating circuit 105 of FIG. 9) operate in synchronism with rotation of the cylinder 500, such that for example in a track pattern produced on the magnetic tape by the second embodiment of the invention as shown in FIG. 18, the tracks designated as T0 and T1 are successively recorded by heads A and A' respectively, then the tracks T2 and T3 are recorded by the second pair of heads B and B' respectively, and so on. Thus, the track containing the segment 903 and the track containing the segments 901, 905 have been recorded by two different heads, which are spaced apart by 180° on the head cylinder. Hence, if for example the burst error indicated in track T0 is caused by a dust particle adhering to the head gap of one head, so that the sample 903 is lost, there is no possibility that this could also result in a burst error occurring in track T2, so that the samples 901 and 905 will be available for use in compensating for the lost sample. That will be true for each of the other samples that have been lost from track T0 as a result of that burst error. It will also be true if a similar burst error then occurs in track T4, which is recorded by the same head as track T0.

Hence it will always be possible to achieve optimum "retouching" compensation at the time of playback, by using for interpolation processing a set of samples including the two adjacent samples of the same line and same channel as a sample that has been lost, even in a case where long-duration burst errors are generated by one of the heads in two or more successive tracks that are recorded by that head. This is a significant advantage of the second embodiment of the present invention.

Although the above description of each of the first and second embodiments has been given for the case of processing and recording the channel 0 samples of a field, similar processing is of course applied to the channel 1 samples of each field.

Furthermore although the description has been given of embodiments for recording PAL standard and NTSC standard digital video signals, it would be equally possible to apply the invention to signals of other television standards, by using appropriate values for the shuffling constants (A, B, C).

With an apparatus according to the present invention, it is necessary to appropriately synchronize the operation of certain circuits (including the read address generating circuit 105 in FIG. 9) to the rotation of the head cylinder of the VTR, to ensure that each sector read out from the field memory is recorded onto one corresponding track of the recording medium. However since methods of achieving such synchronization are now well known in the art, description has been omitted in the above.

What is claimed is:

1. In a recording apparatus for recording on a recording medium a digital video signal comprising successive samples, said samples being arrayed in successive lines and fields of said video signal, said apparatus including channel allocation means for allocating alternate ones of said samples of each line of said video signal to a first recording channel and a second recording channel respectively and recording means for recording samples of said first and second channels on respectively different tracks of said recording medium, a data rearrangement apparatus coupled between said channel allocation means and said recording means, said data rearrangement apparatus comprising for each of said channels;

field memory means (103) wherein a two-dimensional array of memory locations is defined by two-dimensional memory addresses;

data shuffling means (101) for assigning to said samples of said channel of one field of said digital video signal, within each of successive fixed sets of said samples, respectively block numbers (Oblk) each specifying one of a fixed plurality of blocks, and respective intra-block addresses (Hd), for executing on said blocks respectively different shuffling operations based on said block numbers and block addresses to obtain respective converted intra-block addresses (Obyt) and for assigning the respective converted intra-block addresses to respective samples, and for outputting said samples in synchronism with outputting corresponding ones of said block numbers and converted intra-block addresses;

write address generating means respective to said block numbers (Oblk) and converted intra-block addresses (Obyt) for sequentially writing said samples outputted from said data shuffling means into said field memory means along a first direction of said array; and read address generating circuit means (105) for generating memory addresses for successively reading out from said field memory means, along a second direction of said array, each of a plurality of segments of said samples of said channel of one field, said segments being stored in respective regions of said field memory means, and for supplying said samples thus read out to said recording means at timings such that said samples of respective ones of said segments are written onto respectively different ones of said tracks of said recording medium;

said shuffling operations and specific regions being respectively predetermined such that adjacent samples of a same line and same channel in a field are written into respectively different ones of said regions.

2. An apparatus according to claim 1, wherein said digital video signal is obtained by converting an NTSC standard video signal to digital form, wherein for each of said channels, alternate ones of said tracks are recorded by respectively different ones of a plurality of recording heads, and in which said array configuration and specific regions are predetermined such that said adjacent samples of the same channel and same line are recorded by respectively different ones of said heads.

3. In a recording apparatus for recording on a recording medium a digital video signal comprising successive samples, said samples being arrayed in successive lines and fields of said video signal, said apparatus including channel allocation means for allocating alternate ones of said samples of each line of said video signal to a first recording channel and a second recording channel respectively and recording means for recording samples of said first and second channels on respectively different tracks of said recording medium, a data rearrangement apparatus coupled between said channel allocation means and said recording means, said data rearrangement apparatus comprising for each of said channels:

field memory means (103) wherein a two-dimensional array of memory locations is defined by two-dimensional memory addresses;

data shuffling means (101) for assigning to said samples of said channel of one field of said digital video signal, within each of successive lines of the video signal, respectively block numbers (Oblk) each specifying one of a fixed plurality of blocks, and respective intra-block addresses (Hd), for executing on said blocks respectively different shuffling operations based on said block numbers and block addresses to obtain respective converted intra-block addresses (Obyt) and for assigning the respective converted intra-block addresses to respective samples, and for outputting said samples in synchronism with outputting corresponding ones of said block numbers and converted intra-block addresses;

write address generating circuit means (104) respective to said converted intra-block addresses (Obyt) and block numbers (Oblk) for generating corresponding memory addresses (Row, Col) for writing said samples outputted from said intra-line shuffling circuit means into said field memory means along a first direction of said array; and read address generating circuit means (105) for generating successive memory addresses (Row, Col) for successively reading out from said field memory means along a second direction of said array, each of a plurality of segments of said samples, said segments being stored in respective regions of said field memory means, and for supplying said samples thus read out to said recording means at timings such that said samples of respective ones of said segments are written onto respectively different ones of said tracks of said recording medium;

said shuffling operations being respectively predetermined such that adjacent samples of a same line and same channel in a field are written into respectively different ones of said regions.

4. An apparatus according to claim 3, further comprising video address generating circuit means (52) for generating in correspondence with each of said digital video signal a line number (L) and an intra-line position number (Hch), and wherein said intra-line shuffling circuit means comprises:

a plurality of line memories (201, 202, 203) respectively corresponding to said blocks:

line memory write address generating circuit means (204) responsive to said line number (L) and intra-line position number (Hch) corresponding to said each sample, for selecting one of said line memories in accordance with said block number, and for generating a converted intra-block address (Obyt) for writing said each sample into said selected one of the line memories, said converted intra-block address being generated by calculation based on a conversion equation in which said line number (L), block number (Oblk) and intra-line position number (Hch) are variable parameters; and read address generating circuit means (205) for sequentially reading out said samples from said line memories in synchronism with generating respectively corresponding values of said block number (Oblk) and said converted intra-block address (Obyt).

5. In a recording apparatus for recording on a recording medium a digital video signal comprising successive samples, said samples being arrayed in successive lines and fields of said video signal, said apparatus including channel allocation means for allocating alternate ones of said samples of each line of said video signal to a first recording channel and a second recording channel respectively and recording means for recording samples of said first and second channels on respectively different tracks of said recording medium, the improvement comprising:

a data rearrangement apparatus coupled between said channel allocation means and said recording means to enable recording and reproducing successive digital samples alternately sent to the first and second recording channels by respectively different ones of two pairs of heads, said data rearrangement apparatus comprising for each of said channels:

field memory means (103) wherein a two-dimensional array of memory locations is defined by two-dimensional memory addresses;

data shuffling means (101) for assigning to said samples of said channel of one field of said digital video signal, within each of successive lines of the video signal, respectively block numbers (Oblk) each specifying one of a fixed plurality of blocks, and respective intra-block addresses (Hd), for executing on said blocks respectively different shuffling operations based on said block numbers and block addresses to obtain respective converted intra-block addresses (Obyt) and for assigning the respective converted intra-block addresses to respective samples, and for outputting said samples in synchronism with outputting corresponding ones of said block numbers and converted intra-block addresses;

write address generating circuit means (104) respective to said converted intra-block addresses (Obyt) and block numbers (Oblk) for generating corresponding memory addresses (Row, Col) for writing said samples outputted from said intra-line shuffling circuit means into said field memory means along a first direction of said array; and read address generating circuit means (105) for generating successive memory addresses (Row, Col) for successively reading out from said field memory means along a second direction of said array, each of a plurality of segments of said samples, said segments being stored in respective regions of said field memory means, and for supplying said samples thus read out to said recording means at timings such that said samples of respective ones of said segments are written onto respectively different ones of said tracks of said recording medium;

said shuffling operations being respectively predetermined such that adjacent samples of a same line and same channel in a field are written into respectively different ones of said regions.

* * * * *